United States Patent
Duncan et al.

(10) Patent No.: US 9,806,955 B2
(45) Date of Patent: Oct. 31, 2017

(54) NETWORK SERVICE INCIDENT PREDICTION

(71) Applicant: Accenture Global Services Limited, Dublin (IE)

(72) Inventors: Peter T. Duncan, Discovery Bay, CA (US); Kundan Lal Sareen, Katy, TX (US); Jai Advani, Atlanta, GA (US); Amab D. Chakraborty, Bangalore (IN); Vinita V. Nair, Bangalore (IN); Vinoth Venkataraman, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 186 days.

(21) Appl. No.: 14/831,168

(22) Filed: Aug. 20, 2015

(65) Prior Publication Data
US 2017/0054605 A1    Feb. 23, 2017

(51) Int. Cl.
*G06F 15/173* (2006.01)
*H04L 12/24* (2006.01)
(Continued)

(52) U.S. Cl.
CPC .......... *H04L 41/145* (2013.01); *G06F 11/008* (2013.01); *H04L 41/0686* (2013.01);
(Continued)

(58) Field of Classification Search
CPC ............. H04L 41/145; H04L 41/5038; H04L 41/0686; H04L 41/147; H04L 41/16; H04L 41/0636; H04L 43/10; G06F 11/008
See application file for complete search history.

(56) References Cited

U.S. PATENT DOCUMENTS

| 7,158,022 B2* | 1/2007 | Fallon .............. G08B 13/19656 340/505 |
| 8,266,027 B2* | 9/2012 | Moritz ................... G06Q 30/00 235/385 |

(Continued)

FOREIGN PATENT DOCUMENTS

| EP | 2871803 | 5/2015 |
| WO | WO9724839 A2 | 7/1997 |

OTHER PUBLICATIONS

Australian First Examination Report corresponding to Australian patent application No. 2016208437, dated Sep. 2, 2016, 5 pages.
(Continued)

*Primary Examiner* — Richard G Keehn
(74) *Attorney, Agent, or Firm* — Harrity & Harrity, LLP

(57) ABSTRACT

A device may obtain first information related to network devices of a network. The device may obtain second information related to the network devices and/or to one or more historic network service incidents. The one or more historic network service incidents may be related to network services provided in association with the network devices. The one or more historic network service incidents may include outages and/or degradations of one or more network services. The device may perform an analysis of the first information and the second information. The device may train a predictive model based on the analysis of the first information and the second information. The predictive model may predict a probability of a future network service incident based on the first information and/or the second information. The device may cause third information, related to the network devices, to be monitored based on the predictive model.

20 Claims, 16 Drawing Sheets

(51) Int. Cl.
*G06F 11/00* (2006.01)
*H04L 12/26* (2006.01)

(52) U.S. Cl.
CPC ........ *H04L 41/147* (2013.01); *H04L 41/5038* (2013.01); *H04L 43/10* (2013.01); *H04L 41/0636* (2013.01); *H04L 41/16* (2013.01)

(56) References Cited

U.S. PATENT DOCUMENTS

| | | | |
|---|---|---|---|
| 8,305,911 | B2 | 11/2012 | Diwakar et al. |
| 2005/0091369 | A1* | 4/2005 | Jones ............... H04L 41/06 709/224 |
| 2008/0250265 | A1 | 10/2008 | Chang et al. |
| 2010/0313072 | A1* | 12/2010 | Suffern ............ G06F 11/0706 714/37 |
| 2011/0172973 | A1* | 7/2011 | Richards ............ G05B 17/02 703/2 |
| 2014/0280679 | A1* | 9/2014 | Dey ................. H04L 67/2842 709/213 |
| 2015/0095718 | A1 | 4/2015 | Otsuka et al. |
| 2015/0193325 | A1* | 7/2015 | Harsan-Farr ......... G06F 11/008 702/186 |
| 2015/0249512 | A1* | 9/2015 | Adimatyam ........... H04H 20/12 725/107 |
| 2016/0019565 | A1* | 1/2016 | Doganata ............ H04L 12/185 705/7.31 |
| 2016/0161375 | A1* | 6/2016 | Harpale ............. G01M 99/008 702/183 |
| 2016/0359683 | A1* | 12/2016 | Bartfai-Walcott ...... H04L 41/22 |

OTHER PUBLICATIONS

Vidalenc et al., "Proactive Fault Management based on Risk-Augmented Routing", IEEE International Workshop on Management Emerging Networks on Services, Dec. 6, 2010, 5 pages, XP031859260.

Extended European Search Report corresponding to EP Application No. 16184730.6, mailed on Dec. 2, 2016, 12 pages.

* cited by examiner

NETWORK SERVICE INCIDENT PREDICTION

BACKGROUND

Information technology system management tools and processes are used to monitor network devices to identify network service incidents (e.g., service degradations, service interruptions, service failures, etc.). The network devices may monitor operational information of the network devices, such as central processing unit usage, memory usage, data throughput, or the like.

SUMMARY

A device may include one or more processors. The one or more processors may obtain first information related to network devices of a network. The one or more processors may obtain second information related to the network devices and/or to one or more historic network service incidents associated with the network devices. The second information may be different than the first information, and the one or more historic network service incidents may be related to network services provided in association with the network devices. The one or more historic network service incidents may include outages and/or degradations of one or more network services. The one or more processors may perform an analysis of the first information and the second information. The one or more processors may train a predictive model based on the analysis of the first information and the second information. The predictive model may predict a probability of a future network service incident based on the first information and/or the second information. The one or more processors may cause third information, related to the network devices, to be monitored based on the predictive model.

A computer-readable medium may store one or more instructions that, when executed by one or more processors, cause the one or more processors to obtain first information related to network devices of a network. The one or more instructions, when executed by one or more processors, may cause the one or more processors to obtain second information related to the network devices and to one or more historic network service incidents associated with the network devices. The second information may be different than the first information, and the one or more historic network service incidents may be related to network services provided in association with the network devices. The one or more instructions, when executed by one or more processors, may cause the one or more processors to perform an analysis of the first information and the second information. The one or more instructions, when executed by one or more processors, may cause the one or more processors to predict a business impact, related to a future network service incident, based on performing the analysis of the first information and the second information. The one or more instructions, when executed by one or more processors, may cause the one or more processors to generate a remediation plan, based on the business impact and related to the network devices, to reduce a cost related to the future network service incident. The one or more instructions, when executed by one or more processors, may cause the one or more processors to provide information related to the remediation plan and/or the business impact.

A method may include obtaining first information related to network devices of a network. The method may include obtaining second information related to the network devices and/or to one or more historic network service incidents associated with the network devices. The second information may be different than the first information, and the one or more historic network service incidents may be related to network services provided in association with the network devices. The method may include performing an analysis of the first information and the second information. The method may include training a predictive model based on the analysis of the first information and the second information. The predictive model may predict a probability of a future network service incident based on the first information and the second information. The method may include causing third information, related to the network devices, to be monitored based on the predictive model.

DETAILED DESCRIPTION

The following detailed description of example implementations refers to the accompanying drawings. The same reference numbers in different drawings may identify the same or similar elements.

A network, such as an enterprise network, a telecommunication network, a cloud computing network, or another type of network, may include a set of network devices that provides a network service. The network service may undergo a network service incident, such as a network service degradation, a network service interruption, a network service failure, or the like. The network service incident may occur based on a malfunction of one or more of the set of network devices, based on an outage associated with a location that includes one or more of the set of network devices, based on a quantity of users accessing the network service, based on a link failure between two of the set of network devices, or the like. A network monitoring device may monitor the set of network devices to determine when the network service undergoes a network service incident and, in some cases, may reconfigure the set of network devices based on the network service incident.

However, information gathered when monitoring the set of network devices may be unstructured and/or inconsistently formatted, which may hinder analysis of the information. Further, the network monitoring device may identify the network service incident retrospectively (e.g., based on information indicating that the network service incident is currently occurring or has already occurred). Implementations described herein may enable a device to structure and/or normalize the information into a network analytic record (e.g., an enterprise network analytic record, a telecommunication network analytic record, a cloud computing network analytic record, etc.) to facilitate analyzing the information, and to receive engineering insights (e.g., information identifying vulnerabilities, combinations of the information to monitor, particular scenarios which may trigger network service incidents, etc.). Based on the structured, normalized information, the device may predict network service incidents based on information associated with historic network incidents, and may provide automated recommendations for remediation of the set of network devices. Thus, the device reduces costs associated with the network, reduces a probability of future network service incidents, and permits a network administrator to remediate the network to avoid the network service incidents.

Figure 1A:
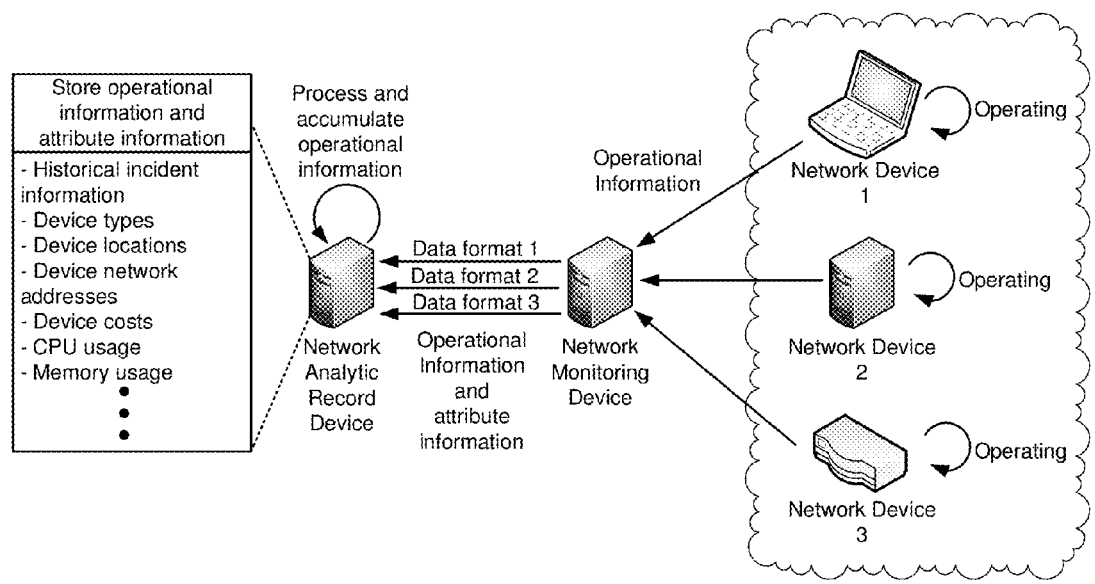
FIGS. 1A-1D are diagrams of an overview of an example implementation described herein.

FIGS. 1A-1D are diagrams of an overview of an example implementation 100 described herein. As shown in FIG. 1A, network device 1, network device 2, and network device 3 may provide operational information to a network monitoring device. As further shown, the network monitoring device may provide the operational information to a network analytic record device. As shown, the operational information is provided in a variety of formats (e.g., data format 1, data format 2, and data format 3).

As further shown in FIG. 1A, the network analytic record device may process the received operational information, and may store the received and processed operational information in addition to attribute information. As shown, the network analytic record device may store historic network service incident information, information identifying device types of network devices 1-3, information identifying locations of network devices 1-3, information identifying network addresses of network devices 1-3, information identifying costs associated with network devices 1-3, information identifying central processing unit (CPU) usage of network devices 1-3, information identifying memory usage of network devices 1-3, or the like. The attribute information may include information associated with network devices 1-3 and/or a configuration of network devices 1-3, such as the device types, the device locations, the device values, the device costs, or the like. The operational information may include information related to operating network device 250, such as the CPU usage, the memory usage, or the like.

Figures 1B, 1C:
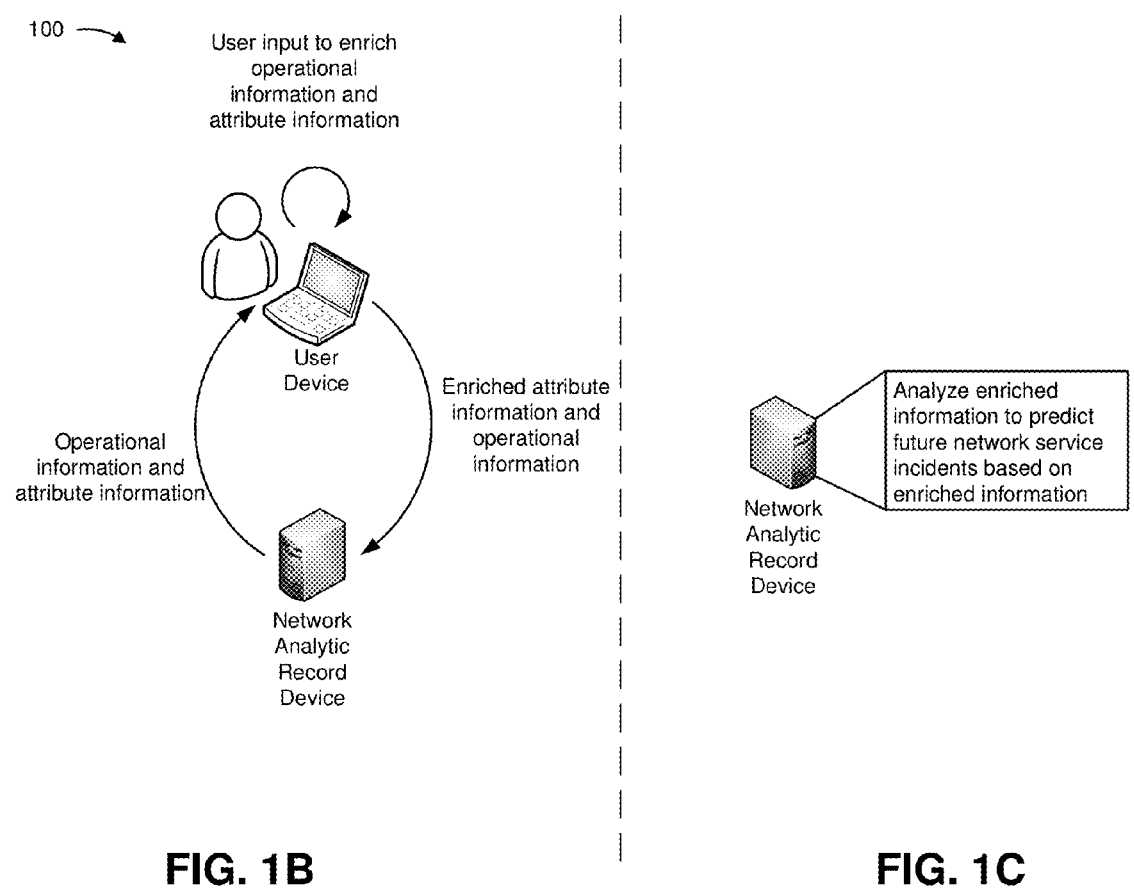

As shown in FIG. 1B, the network analytic record device may provide the processed attribute information and the processed operational information to a user device. As further shown, a user, of the user device, may provide user input to enrich the operational information and the attribute information. For example, the user may specify information related to a criticality of particular network devices and/or network services, a cost associated with a network service incident, or the like. As shown, the user device may provide the enriched operational information and attribute information to the network analytic record device.

As shown in FIG. 1C, the network analytic record device may analyze the enriched attribute information and operational information to predict future network service incidents based on the enriched information. In some implementations, the network analytic record device may generate a predictive model. The predictive model, in some cases, may identify network services and/or network devices associated with a particular business impact, such as a cost increase, a quality-of-service degradation, or the like. In some cases, the network analytic record device may determine a remediation plan based on which to add, remove, or modify network devices in order to reduce a quantity and/or likelihood of network service incidents.

Figure 1D:
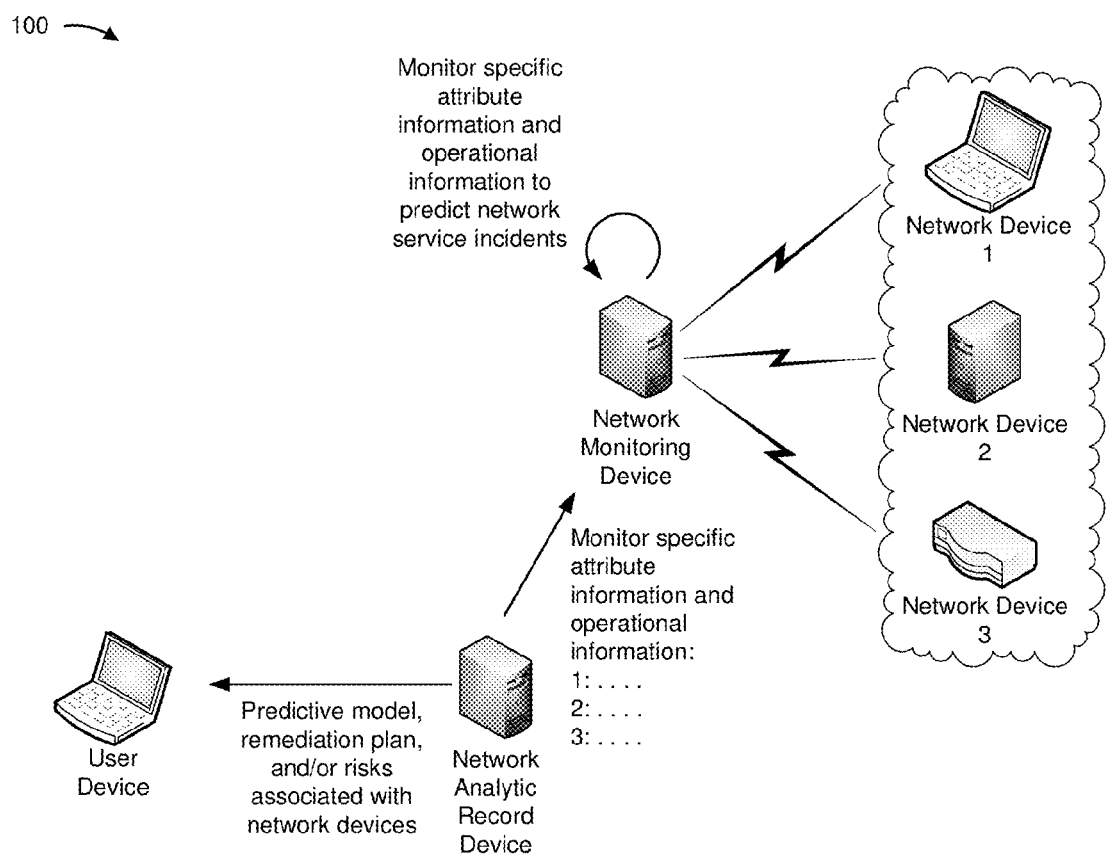

As shown in FIG. 1D, the network analytic record device may provide the predictive model, the remediation plan, and/or information identifying risks associated with the network devices to the user device. As further shown, the network analytic record device may provide, to the network monitoring device, information identifying specific operational information to monitor. As shown, the network monitoring device may monitor the specific operational information, to predict network service incidents based on the specific operational information.

In this way, the network analytic record device may gather attribute information for a set of network devices, and may accumulate operation information related to operating the set of network devices. The network analytic record device may generate a predictive model based on historically strong predictors of network service incidents to predict future network service incidents. The network analytic record device, or another device, may predict the future network incidents, and/or may determine remediation plans to reduce costs associated with the network and/or improve network resilience. In this way, the network analytic record device may reduce a quantity and/or severity of network service incidents, and may reduce a cost of implementing and/or maintaining network 240.

Figure 2:
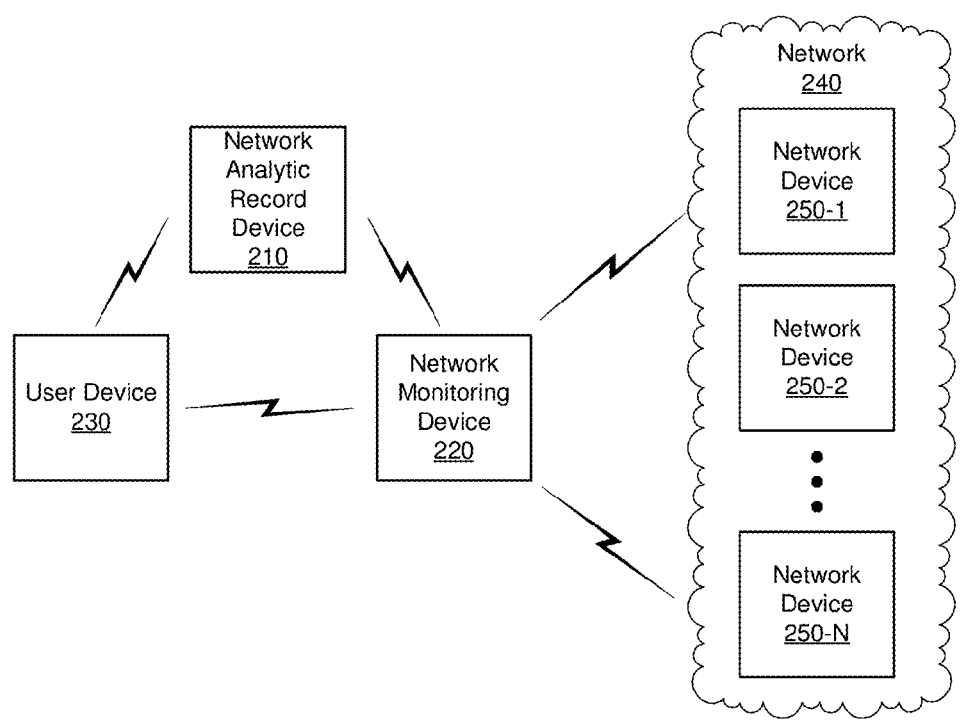
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an network analytic record device 210, a network monitoring device 220, a user device 230, a network 240, and one or more network devices 250-1 through 250-N ($N \geq 1$) (hereinafter referred to collectively as "network devices 250," and individually as "network device 250"). Devices of environment 200 may interconnect via wired connections, wireless connections, or a combination of wired and wireless connections.

Network analytic record device 210 may include one or more devices capable of receiving, generating, storing, processing, and/or providing information. For example, network analytic record device 210 may include a laptop computer, a desktop computer, a tablet computer, a server, a group of servers, or a similar device. Network analytic record device 210 may receive attribute information and/or operational information, relating to network device 250 and/or network services provided by network device 250, from network monitoring device 220 and/or network device 250.

Network analytic record device 210 may perform operations on the attribute information and/or operational information (e.g., operations to structure the information, operations to normalize the information, operations to analyze the information, etc.). In some implementations, network analytic record device 210 may receive input relating to the attribute information and/or the operational information from another device (e.g., user device 230, etc.). Network analytic record device 210 may analyze the attribute information and/or operational information based on the input. Network analytic record device 210 may provide information to another device (e.g., network monitoring device 220, user device 230, network device 250, etc.) based on the analysis.

Network monitoring device 220 may include one or more devices capable of receiving, storing, processing, and/or providing information related to a network service. For example, network monitoring device 220 may include a router, a gateway, a server (e.g., a proxy server), a group of servers, or a similar device. Network monitoring device 220 may obtain attribute information and/or operational information from and/or relating to network device 250 and/or a network service provided by network device 250. Network monitoring device 220 may provide the attribute information and/or operational information to network analytic record device 210 or another device (e.g., user device 230, etc.). In some implementations, network monitoring device 220 may input the attribute information and/or operational information to a predictive model in order to predict a network service incident.

User device 230 may include one or more devices capable of receiving, generating, storing, processing, and/or providing information. For example, user device 230 may include a communication and/or computing device, such as a mobile phone (e.g., a smart phone, etc.), a laptop computer, a desktop computer, a tablet computer, a handheld computer, or a similar type of device. User device 230 may receive attribute information and/or operational information from network analytic record device 210, network monitoring device 220, or another device. User device 230 may obtain user input related to the attribute information and/or the operational information (e.g., criticality coefficients, costs associated with network device 250 and/or a network service, etc.), and may provide the input to network analytic record device 210 in association with the attribute information and/or the operational information. In some implementations, user device 230 may receive and/or provide (e.g., via a user interface of user device 230) information from network analytic record device 210 (e.g., a predictive model, a risk rating of network device 250, a remediation action related to network device 250, etc.).

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a private network, an ad hoc network, an intranet, a fiber optic-based network, a cloud computing network, or the like, and/or a combination of these or other types of networks. Network 240 may include a set of network devices 250-1 through 250-N.

Network device 250 may include one or more devices (e.g., one or more traffic transfer devices) capable of processing and/or transferring traffic between endpoint devices. For example, network device 250 may include a firewall, a router, a gateway, a switch, a hub, a bridge, a reverse proxy, a server (e.g., a proxy server), a security device, an intrusion detection device, a load balancer, or a similar device. In some implementations, network devices 250-1 through 250-N may include a combination of two or more of the above devices. One or more network devices 250 may provide a network service via network 240 (e.g., an Internet Protocol (IP) voice service, a network administration control service, an analog voice service, an analog facsimile service, a wireless access service, a telepresence service, a virtual private network service, a routing/switching service, a contact center service, or another type of network service).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
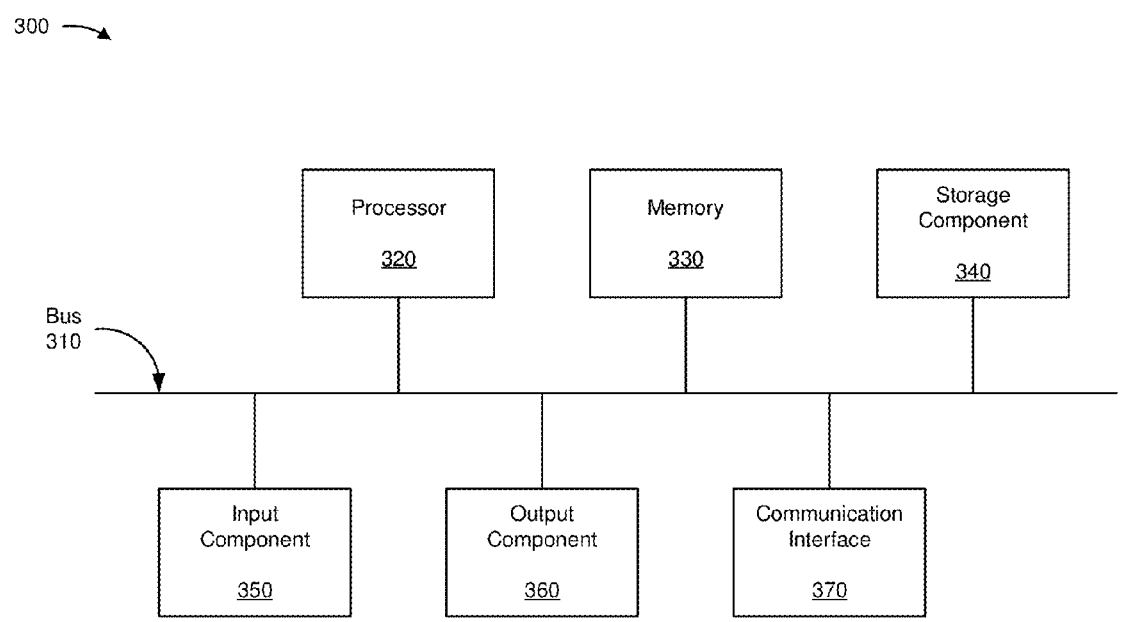
FIG. 3 is a diagram of example components of one or more devices of FIG. 2.

FIG. 3 is a diagram of example components of a device 300. Device 300 may correspond to network analytic record device 210, network monitoring device 220, user device 230, and/or network device 250. In some implementations, network analytic record device 210, network monitoring device 220, user device 230, and/or network device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
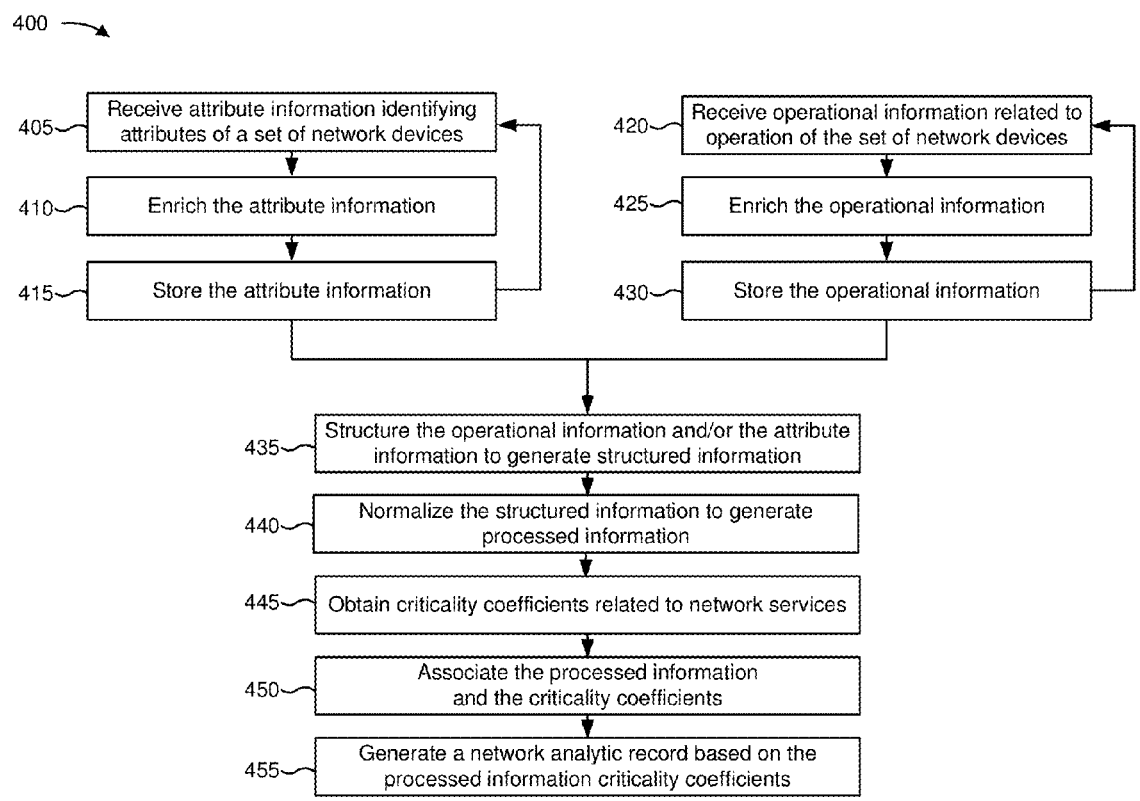
FIG. 4 is a flow chart of an example process for receiving, enriching, processing, and/or storing attribute information and/or operational information.

FIG. 4 is a flow chart of an example process 400 for receiving, enriching, processing, and/or storing attribute information and/or operational information. In some implementations, one or more process blocks of FIG. 4 may be performed by network analytic record device 210. In some implementations, one or more process blocks of FIG. 4 may be performed by another device or a group of devices separate from or including network analytic record device 210, such as network monitoring device 220, user device 230, and/or network device 250.

As shown in FIG. 4, process 400 may include receiving attribute information identifying static attributes of a set of network devices (block 405). For example, network analytic record device 210 may receive attribute information. The attribute information may identify static attributes of a set of network devices 250 of network 240. In some implementations, network analytic record device 210 may receive the attribute information from network monitoring device 220, based on network monitoring device 220 obtaining (e.g., receiving, gathering, etc.) the attribute information from the set of network devices 250. Additionally, or alternatively, network analytic record device 210 may receive the attribute information from user device 230 (e.g., based on a user input, based on a configuration file associated with the set of network devices 250, etc.).

The attribute information may relate to network device 250. For example, the attribute information may identify a model of network device 250, an operating system of network device 250, a configuration of network device 250, a firmware version of network device 250, a capacity of network device 250 (e.g., a CPU capacity, a memory capacity, a bandwidth capacity, etc.), a price associated with network device 250, (e.g., a price to purchase, a price to maintain, a price to replace, etc.), information related to a manufacturer warranty of network device 250, maintenance operations performed in relation to network device 250, a location of network device 250 (e.g., a physical location, a location in relation to other network devices 250, etc.), or other information.

In some implementations, network analytic record device 210 may receive the attribute information periodically (e.g., every five minutes, every thirty minutes, once a day, once a week, etc.). Additionally, or alternatively, network analytic record device 210 may request the attribute information (e.g., from network monitoring device 220, from user device 230, from network device 250, etc.), and may receive the attribute information from network monitoring device 220, user device 230, network device 250, or the like. In some implementations, network analytic record device 210 may obtain the attribute information from network monitoring device 220. For example, network monitoring device 220 may obtain the attribute information from one or more network device 250, and may provide the attribute information to network analytic record device 210 (e.g., periodically, based on a request from network analytic record device 210, etc.).

As further shown in FIG. 4, process 400 may include enriching the attribute information (block 410). For example, network analytic record device 210 may enrich the attribute information by structuring the attribute information, normalizing the attribute information, obtaining criticality coefficients related to the attribute information, or the like, as described in more detail below.

In some implementations, network analytic record device 210 may enrich the attribute information by obtaining information related to the attribute information. For example, network analytic record device 210 may receive input identifying a location associated with the attribute information, a network service associated with the attribute information, a business service associated with the attribute information, other parameters related to the network, or the like. In some implementations, network analytic record device 210 may obtain user input, such as engineering insights, in relation to the attribute information. The engineering insights may identify, for example, particular network devices 250 to monitor, particular combinations of attribute information to monitor, a condition that, when satisfied, causes network analytic record device 210 to perform an action, or the like. In some implementations, network analytic record device 210 may receive the user input (e.g., the engineering insights) from another device, such as user device 230.

Network analytic record device 210 may associate the attribute information with the obtained information, which may permit network analytic record device 210 to improve accuracy of analysis of the attribute information. In some implementations, network analytic record device 210 may determine information related to the attribute information. For example, network analytic record device 210 may perform a statistical analysis of the attribute information to enrich the attribute information.

As further shown in FIG. 4, process 400 may include storing the attribute information and/or returning to block 405 (block 415). For example, network analytic record device 210 may store the attribute information. In some implementations, network analytic record device 210 may store the attribute information locally. Additionally, or alternatively, network analytic record device 210 may store the attribute information on another device, and may access the attribute information to perform operations to process and/or analyze the attribute information. In some implementations, network analytic record device 210 may return to block 410. For example, network analytic record device may obtain additional attribute information, may enrich the additional attribute information, and may store the additional attribute information (e.g., in association with the original attribute information).

As further shown in FIG. 4, process 400 may include receiving operational information related to the set of network devices and/or a network service associated with the set of network devices (block 420). For example, network analytic record device 210 may receive operational information. The operational information may relate to the set of network devices 250 and/or to a network service provided in association with the set of network devices 250. In some implementations, network analytic record device 210 may receive the operational information from network monitoring device 220. Additionally, or alternatively, network analytic record device 210 may receive the operational information from another device (e.g., user device 230, network device 250, etc.).

In some implementations, the operational information may relate to operation of network device 250. For example, the operational information may identify a CPU usage of network device 250 (e.g., a peak CPU usage, an average CPU usage, a CPU usage in a standby mode, etc.), a memory usage of network device 250 (e.g., a long-term memory usage, a RAM usage, etc.), interface usage (e.g., a lag associated with an interface interaction, usage of a first portion of an interface as compared to usage of a second portion of the interface, a minimum interface usage, a maximum interface usage, an average interface usage, etc.), or the like.

In some implementations, the operational information may relate to a network service. A network service may include a service and/or an application provided by and/or via one or more network devices 250. For example, a network service may include a data storage service, a data manipulation service, a data presentation service, a communication service, a firewall service, or the like. The network service may be implemented using a particular architecture (e.g., a client-to-server architecture between an endpoint device and a network device 250, a peer-to-peer architecture between endpoint devices, etc.). One or more network devices 250 may provide a network service to and/or from another device, such as an endpoint device, a user device, a sensor device, a server device, a control device, a storage device, or the like.

In some implementations, the operational information associated with the network service may include information identifying a latency associated with the network service, an amount of information transmitted in association with the network service, a quantity of users associated with the network service, a quantity of network devices 250 associated with the network service, a cost and/or price associated with providing the network service, a cost associated with a failure of the network service (e.g., a cost associated with a productivity impact of the failure, a cost associated with a revenue impact of the failure, etc.), a criticality of the network service, a location associated with the network service (e.g., a physical location, a location of network devices 250 associated with the network service, etc.), or the like.

In some implementations, network analytic record device 210 may receive the operational information periodically (e.g., every five minutes, every thirty minutes, once a day, once a week, etc.). Additionally, or alternatively, network analytic record device 210 may request the operational information (e.g., from network monitoring device 220, from user device 230, from network device 250, etc.), and may receive the operational information from network monitoring device 220, user device 230, network device 250, or the like. In some implementations, network analytic record device 210 may obtain the operational information from network monitoring device 220. For example, network monitoring device 220 may obtain the operational information from one or more network devices 250, and may provide the operational information to network analytic record device 210 (e.g., periodically, based on a request from network analytic record device 210, etc.).

As further shown in FIG. 4, process 400 may include enriching the operational information (block 425). For example, network analytic record device 210 may enrich the operational information by structuring the operational information, normalizing the operational information, obtaining criticality coefficients related to the operational information, associating the operational information with attribute information, or the like, as described in more detail below.

In some implementations, network analytic record device 210 may enrich the attribute information and/or the operational information by obtaining information related to the attribute information. For example, network analytic record device 210 may receive input identifying a location associated with the attribute information and/or operational information, a network service associated with the attribute information and/or operational information, a business service associated with the attribute information and/or operational information, other network parameters associated with the attribute information and/or operational information, or the like. In some implementations, network analytic record device 210 may obtain user input, such as engineering insights, in relation to the operational information. The engineering insights may identify, for example, particular network devices 250 to monitor, particular combinations of operational information to monitor, a condition in operational information that, when satisfied, causes network analytic record device 210 to perform an action, or the like. In some implementations, network analytic record device 210 may receive the user input (e.g., the engineering insights) from another device, such as user device 230.

Network analytic record device 210 may associate the attribute information and/or operational information with the obtained information, which may permit network analytic record device 210 to improve accuracy of analysis of the attribute information and/or operational information. In some implementations, network analytic record device 210 may determine information related to the attribute information and/or operational information. For example, network analytic record device 210 may perform a statistical analysis of the attribute information to enrich the attribute information, as described in more detail in connection with FIG. 8, below.

As further shown in FIG. 4, process 400 may include storing the operational information and/or returning to block 420 (block 430). For example, network analytic record device 210 may store the operational information. In some implementations, network analytic record device 210 may store the operational information locally. Additionally, or alternatively, network analytic record device 210 may store the operational information on another device, and may access the operational information to perform operations to process and/or analyze the operational information.

In some implementations, network analytic record device 210 may receive and/or store operational information iteratively. For example, network analytic record device 210 may receive updated operational information after receiving original operational information, and may store the original operational information and/or the updated operational information as network analytic record device 210 receives the updated operational information. Network analytic record device 210 may associate the original operational information and the updated operational information with the attribute information.

In some implementations, network analytic record device 210 may receive operational information related to a network service incident. For example, network analytic record device 210 may receive operational information that identifies a network service incident, a time of the network service incident, one or more network devices 250 associated with the network service incident, a severity of the network service incident (e.g., whether the network service incident was a service failure, a service interruption, a service degradation, etc.), or the like. Network analytic record device 210 may store the operational information related to the network service incident in association with operational information and/or attribute information relating to network devices 250. Network analytic record device 210 may analyze the operational information relating to the network service incident and the operational information and/or attribute information relating to network devices 250 in order to predict future network service incidents, as described in more detail elsewhere herein. In this way, network analytic record device 210 may iteratively receive and/or store operational information, which may permit network analytic record device 210 to predict network service incidents.

Network analytic record device 210 may store the operational information and/or the attribute information in a data structure, in some implementations. For example, network analytic record device 210 may include a data structure to store the operational information and/or the attribute information (e.g., a Structured Query Language (SQL) data structure, etc.). The data structure may include one or more tables that may correspond to different types of operational information and/or attribute information.

A table may include a primary key. The primary key may include a different value for each row, column, etc. in the table. For example, a table may use device identifiers of network devices 250 as a primary key, and each device identifier may be different than the other device identifiers stored in the table. Data that is stored in the table may be associated with a particular primary key. For example, assume that a first row of the table is associated with a first device identifier and assume that a second row of the table is associated with a second device identifier. In this example, data stored in the first row may be associated with the first device identifier and data stored in the second row may be associated with the second device identifier.

A table may include a secondary key. A secondary key of a first table may be used as a primary key of a second table. The secondary key may associate data of the first table and data of the second table. For example, assume that a first table uses location address identifiers, that identify locations of network devices 250, as a first primary key and stores first data in association with location address identifiers. Assume further that a second table uses network service identifiers as a second primary key and stores second data in association with network service identifiers.

In this example, network analytic record device 210 may associate the data stored in the first table with the data stored in the second table by including a value of the second primary key in the first table. For example, to identify a relationship between a particular location address identifier and a particular network service identifier in the table, network analytic record device 210 may insert a second primary key value, of the particular network service identifier, in a row of the first table corresponding to the particular location address identifier. When processing the data stored in the first table, network analytic record device 210 may access, obtain, modify, etc. the data of the particular network service identifier in the second table based on the second primary key.

Different tables of network analytic record device 210 may correspond to different operational information and/or attribute information. For example, a first table may correspond to location types, a second table may correspond to locations, a third table may correspond to configuration information of network devices 250, a fourth table may correspond to maintenance information of network devices 250, a fifth table may correspond to a component category (e.g., chassis, card, endpoint, server, etc.), a sixth table may correspond to network services, a seventh table may correspond to criticality coefficients of network services and/or network devices 250, and so on.

As further shown in FIG. 4, process 400 may include structuring the operational information and/or the attribute information to generate structured information (block 435). For example, in some implementations, network analytic record device 210 may receive unstructured operational information and/or attribute information. Network analytic record device 210 may structure the operational information and/or the attribute information to generate structured information. By generating the structured information, network analytic record device 210 may more easily analyze operational information and/or attribute information, which may conserve processor resources of network analytic record device 210.

Network analytic record device 210 may perform operations to structure the operational information and/or the attribute information, in some implementations. For example, network analytic record device 210 may receive operational information and/or attribute information related to a particular network device 250 and/or a particular network service. Network analytic record device 210 may determine that the operational information and/or the attribute information are unstructured. For example, network analytic record device 210 may receive operational information and/or attribute information in a stream of unstructured operational data, in a plain text file without tags or data structures, in a format that is incompatible with network analytic record device 210, or the like. Network analytic record device 210 may, for example, parse the unstructured operational information and/or attribute information to determine relevant operational information and/or attribute information, and may perform operations to structure the relevant operational information and/or attribute information based on the parsing.

Network analytic record device 210 may structure the operational information and/or the attribute information in a data structure, in some implementations. For example, network analytic record device 210 may include a data structure to store the operational information and/or the attribute information (e.g., a Structured Query Language (SQL) data structure, etc.). The data structure may include one or more tables that may correspond to different types of operational information and/or attribute information.

To structure the attribute information and/or the operational information, network analytic record device 210 may detect a particular primary key in a portion of the relevant operational information and/or attribute information (e.g., a string of text identifying a particular device identifier of network device 250, a physical location address of network device 250, a criticality coefficient, a location type identifier, a network address of network device 250 and/or a network service, information identifying a maintenance contract, etc.). Based on detecting the particular primary key, network analytic record device 210 may store the portion of the relevant operational information and/or attribute information in a particular row, a particular column, etc. of a data structure associated with the particular primary key. In this way, network analytic record device 210 may efficiently access the portion of the relevant operational information, for example, by performing a query of the operational information based on the particular primary key.

As further shown in FIG. 4, process 400 may include normalizing the structured information to generate processed information (block 440). For example, network analytic record device 210 may process unstructured operational information and/or attribute information to generate structured information, as described above. However, the structured information may include data in an inconsistent format and/or data that refers to one data point in two or more ways (e.g., using two or more different text strings, identifiers, etc.). Network analytic record device 210 may normalize the structured information to reduce ambiguity and/or simplify processing of the structured information. Network analytic record device 210 may normalize information by assigning a particular value to similar information values, in some implementations. For example, in a set of information, strings of "azure," "cerulean," "robin's egg," or "royal blue" may be associated with and/or replaced with a string of "blue," which may facilitate analysis of structured operational information and/or attribute information.

Network analytic record device 210 may normalize information by associating the information with a category identifier. The category identifier may identify a category associated with the information. For example, assume that a particular router model of "3750" is associated with three model identifiers of "WS-3750-24F," "WS-3750-48F," and "WS-3750-64F." Assume further that three network devices 250-1 through 250-3 are respectively associated with the three model identifiers. Based on receiving operational information and/or attribute information that includes any of the three model identifiers, network analytic record device 210 may associate the operational information and/or the attribute information with a category identifier (e.g., "Router model 3750," etc.). Based on the category identifier, network analytic record device 210 may more efficiently analyze similar operational information from a variety of network devices, which may improve accuracy of prediction of network service incidents.

Figure 5A:
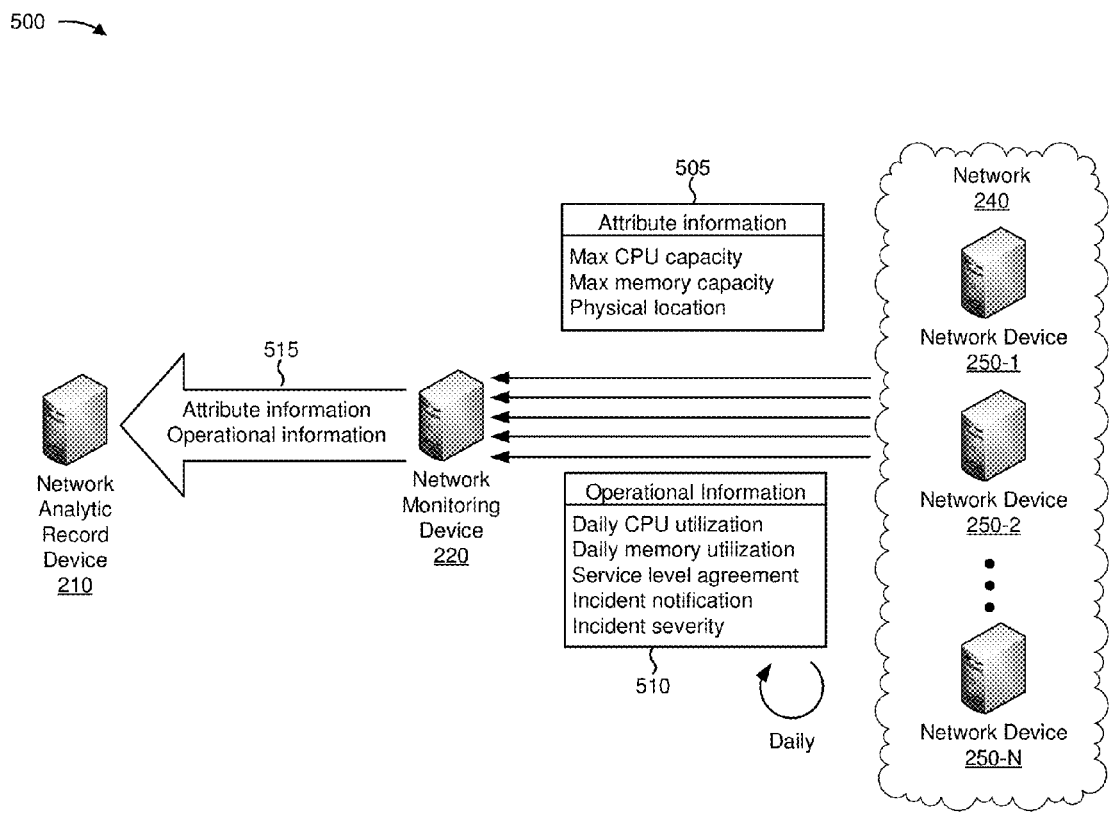
FIGS. 5A-5C are diagrams of an example implementation relating to the example process shown in FIG. 4.
Figure 5B:
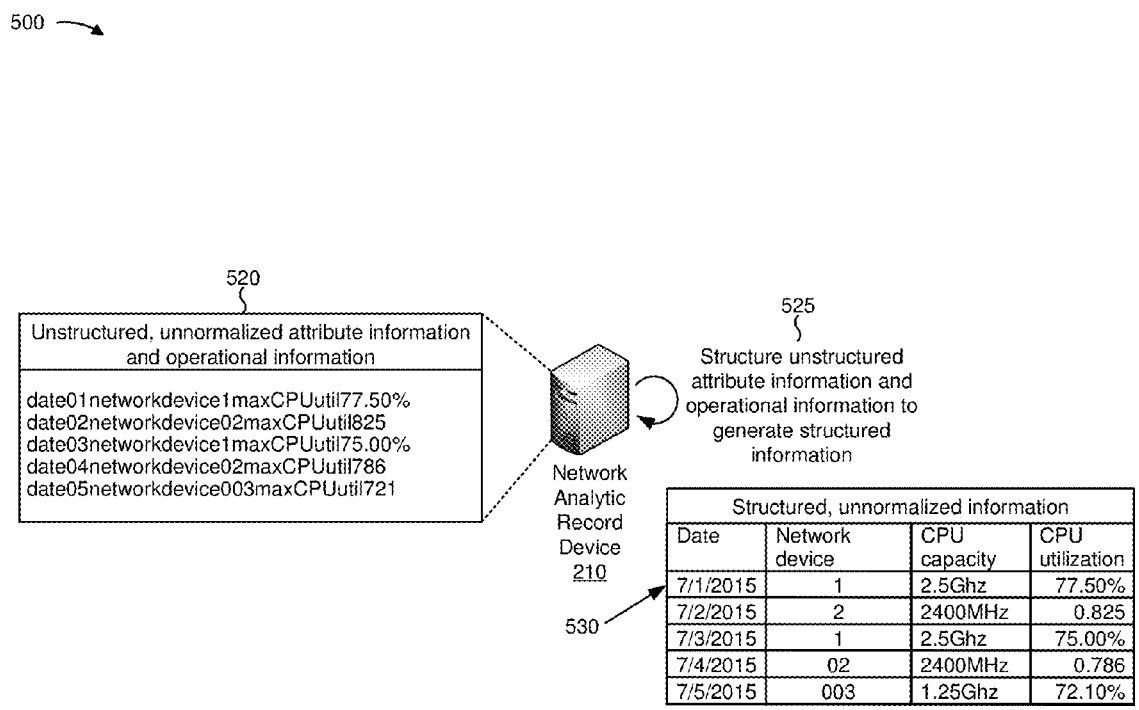
Figure 5C:
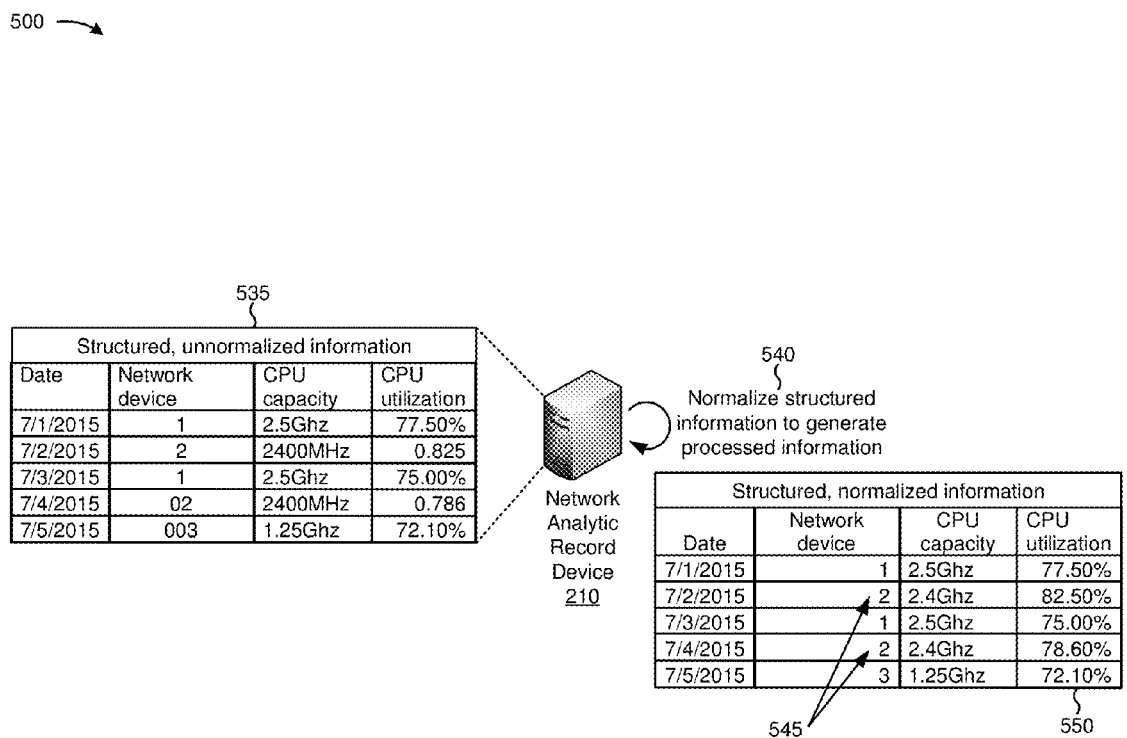

In some implementations, network analytic record device 210 may obtain, structure, and/or normalize operational information and/or attribute information from a variety of sources. For example, network analytic record device 210 may obtain operational information and/or attribute information from a set of network monitoring devices 220 that are associated with different locations, different network services, different business services, or the like. As another example, network analytic record device 210 may obtain attribute information and/or operational information from network monitoring device 220 (e.g., as shown in FIG. 5A, etc.), and may obtain information related to the attribute information and/or operational information via user input (e.g., from a user with subject matter expertise related to the attribute information and/or the operational information, as shown in FIG. 1B, etc.). In some implementations, network analytic record device 210 may structure and/or normalize the operational information and/or attribute information received from the variety of sources, as shown in FIGS. 5B and 5C. For example, network analytic record device 210 may associate attribute information received from a first network monitoring device 220 with operational information received from a second network monitoring device 220, may associate attribute information and/or operational information with information received via user input, or the like. In this way, network analytic record device 210 may obtain, structure, and/or normalize information from a variety of sources, which may improve accuracy of analysis performed by network analytic record device 210.

As further shown in FIG. 4, process 400 may include obtaining criticality coefficients related to network services (block 445). For example, network analytic record device 210 may obtain one or more criticality coefficients related to network services. A criticality coefficient may identify a relative importance and/or value of an associated network service. For example, a criticality coefficient of "1" may indicate that a first network service is associated with a higher importance and/or value than a second network service that is associated with a criticality coefficient of "0.5." Network analytic record device 210 may store a criticality coefficient in one or more data structures, in association with a network service to which the criticality coefficient relates.

A criticality coefficient may relate to particular operational information and/or attribute information associated with a network service. For example, the operational information and/or attribute information associated with a network service may identify an end-of-life date of the network service, an end-of-engineering date of the network service, an end-of-service date of the network service, an end-of-software-maintenance date of the network service, an end-of-routine-failure-analysis date of the network service, an end-of-service-contract-renewal date of the network service, a last-date-of-support date of the network service, or a similar date. In some implementations, the criticality coefficient may relate to a network device 250 associated with the network service. For example, if a network service is provided by network device 250 that is associated with an end-of-life date, network analytic record device 210 may determine a criticality coefficient, of the network service, based on the end-of-life date associated with network device 250.

Network analytic record device 210 may determine the criticality coefficient based on the operational information and/or attribute information. For example, when an end-of-life date of a network service occurs earlier than a particular date, network analytic record device 210 may associate a criticality coefficient of 1 with the network service and/or one or more network devices 250 associated with the network service. In this example, when the end-of-life date occurs later than the particular date, network analytic record device 210 may determine a different criticality coefficient (e.g., 0.5, 0, etc.), based on the end-of-life date occurring later than the particular date. In this way, network analytic record device 210 may determine criticality coefficients based on operational information, which may permit network analytic record device 210 to determine relative importance of different network services, network devices 250, and/or locations.

In some implementations, network analytic record device 210 may determine a criticality coefficient without user input (e.g., automatically). For example, network analytic record device 210 may receive attribute information describing an end-of-life date of network device 250, and may determine the criticality coefficient based on comparing the end-of-life date to a particular date (e.g., a current date, a past date, a future date, etc.). As another example, network analytic record device 210 may receive operational information identifying a vulnerability of a particular network service, and may determine the criticality coefficient based on the vulnerability of the particular network service (e.g., may assign a relatively high criticality coefficient to network services that are more vulnerable, and may assign a relatively low criticality coefficient to network services that are less vulnerable).

In some implementations, network analytic record device 210 may store information associating criticality coefficients with conditions, and may determine a criticality coefficient by comparing the operational information to the conditions. For example, network analytic record device 210 may store a table associating an end-of-life date that occurs before a current date with a criticality coefficient of "1," and associating an end-of-life date on or after the current date with a criticality coefficient of "0." Network analytic record device 210 may determine criticality coefficients by comparing an end-of-life date of a particular network device 250 with the table. In this way, network analytic record device 210 may determine criticality coefficients of network services and/or network devices 250 automatically, which may improve efficiency and/or reduce user input requirements of network analytic record device 210.

In some implementations, network analytic record device 210 may determine a criticality coefficient based on user input. For example, network analytic record device 210 may provide operational information and/or attribute information to user device 230, and a user (e.g., an engineer, etc.) may input a criticality coefficient based on the operational information and/or attribute information (e.g., via a user interface of user device 230).

In some implementations, network analytic record device 210 may provide particular operational information and/or attribute information to user device 230. For example, network analytic record device 210 may identify particular operational information and/or attribute information that may be relevant to determining the criticality coefficient, and may provide the particular operational information and/or attribute information to user device 230. In this way, network analytic record device 210 may determine criticality coefficients based on user inputs, which may reduce local processing requirements of network analytic record device 210 and/or improve accuracy of the criticality coefficients.

As further shown in FIG. 4, process 400 may include associating the processed information and the criticality coefficients (block 450). For example, network analytic record device 210 may associate the normalized information and one or more criticality coefficients that may be determined based on the normalized information. In some implementations, network analytic record device 210 may associate the normalized information and the one or more criticality coefficients by storing the normalized information and the one or more criticality coefficients together in a data structure.

In some implementations, network analytic record device 210 may associate a particular network device 250 with two or more criticality coefficients. For example, if the particular network device 250 is associated with two network services that are associated with two different criticality coefficients, the particular network device 250 may be associated with the two criticality coefficients.

In some implementations, network analytic record device 210 may identify a particular physical location that is associated with multiple criticality coefficients. For example, if the particular physical location is associated with multiple network services and/or network devices 250 that are associated with criticality coefficients, network analytic record device 210 may associate the particular physical location with the criticality coefficients. In some implementations, network analytic record device 210 may determine an aggregate criticality of the physical location, which may aid network analytic record device 210 in identifying potential business impacts of network services incidents associated with the physical location and/or remediation actions to perform in relation to the physical location.

As further shown in FIG. 4, process 400 may include generating a network analytic record based on the processed information and/or the criticality coefficients (block 455). For example, network analytic record device 210 may generate a network analytic record based on the processed information and/or the criticality coefficients. The network analytic record may include the structured and/or normalized attribute information, the structured and/or normalized operational information, and/or the criticality coefficients. In some implementations, the network analytic record may include other information, such as information that describes the processed information and/or the criticality coefficients, information determined by analyzing the processed information and/or the criticality coefficients, user inputs regarding the processed information and/or the criticality coefficients, or the like. In some implementations, network analytic record device may store the network analytic record in a data structure (e.g., a SQL data structure, a table, etc.).

In some implementations, network analytic record device 210 may add information to the network analytic record after generating the network analytic record. For example, if network analytic record device 210 receives additional attribute information and/or operational information, network analytic record device 210 may perform operations described in connection with FIG. 4, and may add the additional attribute information and/or operational information to the network analytic record. In this way, network analytic record device 210 may update the network analytic record based on receiving additional attribute information and/or operational information. By updating the network analytic record, network analytic record device 210 improves forecasting of network incidents and reduces a quantity of the network incidents.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. For example, blocks 410, 415, and/or 420 may be performed in parallel with blocks 425, 430, and/or 435.

FIGS. 5A-5C are diagrams of an example implementation 500 relating to example process 400 shown in FIG. 4. FIGS. 5A-5C show an example of receiving, enriching, processing and/or storing attribute information and/or operational information.

As shown in FIG. 5A, a set of network devices 250-1 through 250-N may be included in a network 240. In some implementations, the set of network devices 250-1 through 250-N may include a variety of different network device types (e.g., user devices, server devices, gateways, routers, switches, hubs, etc.). As shown by reference number 505, the set of network devices 250-1 through 250-N may provide attribute information to network monitoring device 220. As further shown, the attribute information may identify a maximum CPU capacity of the set of network devices 250-1 through 250-N, a maximum memory capacity of the set of network devices 250-1 through 250-N, and a physical location of the set of network devices 250-1 through 250-N.

As shown by reference number 510, the set of network devices 250-1 through 250-N may provide operational information to network monitoring device 220. Assume that the set of network devices 250-1 through 250-N provide the operational information to network monitoring device 220 once a day. As shown, the operational information may include a daily CPU usage of the set of network devices 250-1 through 250-N, a daily memory usage of the set of network devices 250-1 through 250-N, a service level agreement of the set of network devices 250-1 through 250-N, notifications of incidents related to the set of network devices 250-1 through 250-N, and information related to severity of the incidents. As shown, network monitoring device 220 may receive the operational information on a daily basis.

As shown by reference number 515, network monitoring device 220 may provide the attribute information and the operational information to network analytic record device 210. Assume that network monitoring device 220 provides the operational information to network analytic record device 210 based on receiving the operational information (e.g., once a day). As shown, network analytic record device 210 stores the attribute information and the operational information. In this way, the set of network devices 250-1 through 250-N may provide attribute information to network analytic record device 210, and may iteratively provide operational information to network analytic record device 210.

As shown in FIG. 5B, and by reference number 520, network analytic record device 210 may store unstructured and unnormalized operational information and attribute information. As shown, the operational information and attribute information may be in an unstructured format. For example, the operational information and attribute information may not be in a data structure, such as a SQL table, or the like.

As shown by reference number 525, network analytic record device 210 may structure the unstructured attribute information and operational information to generate structured information. Assume that network analytic record device 210 detects particular text strings, based on which to structure the unstructured attribute information. For example, network analytic record device 210 may detect a text string of "date01," as shown in a first portion of the unstructured operational information and attribute information, and may store operational information and attribute information associated with the text string in a particular row of a table. The particular row may be associated with a particular date (e.g., Jul. 1, 2015), as shown by reference number 530.

As another example, network analytic record device 210 may detect a text string of "maxCPUutil77.50%" in the first portion of the operational information and attribute information. Assume that the text string of "maxCPUutil77.50%" indicates a maximum CPU utilization, of a network device 250-1, of 77.5%. Based on the text string of "CPUutil77.50%," network analytic record device 210 may store operational information identifying a maximum CPU usage of 77.50% in the particular row of the table, as shown.

Figure 7A:
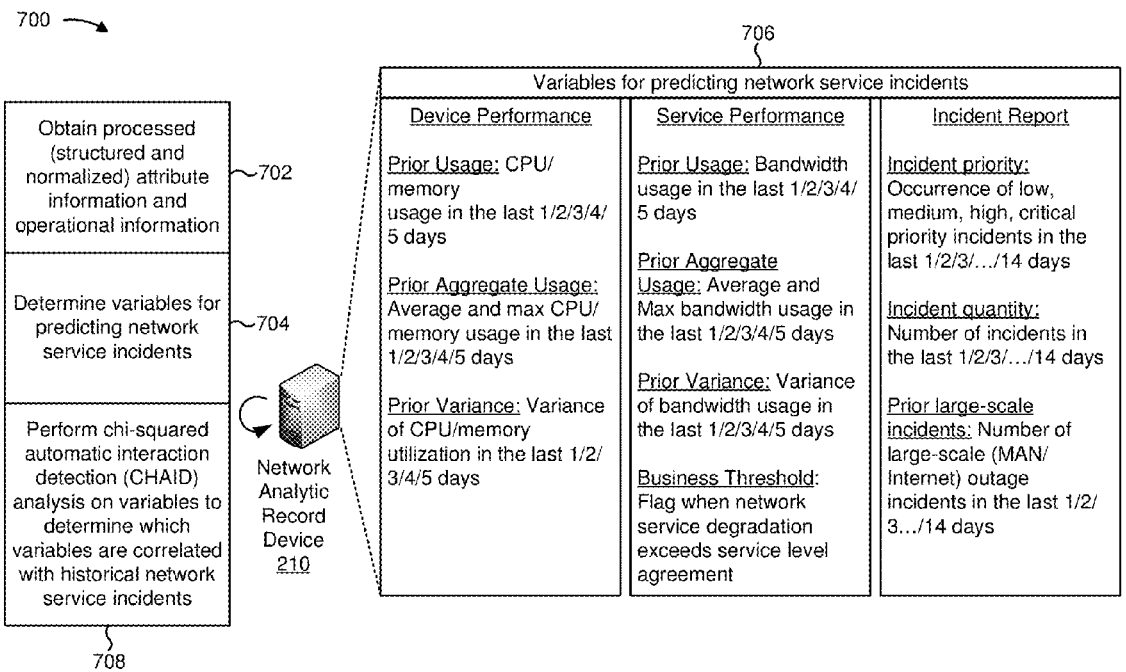
FIGS. 7A and 7B are diagrams of an example implementation relating to the example process shown in FIG. 6.

As shown in FIG. 5C, and by reference number 535, network analytic record device 210 may store the structured, unnormalized information that is determined in connection with FIG. 7A. As shown by reference number 540, network analytic record device 210 may normalize the structured, unnormalized information to generate processed information. To normalize the structured, unnormalized information, network analytic record device 210 may assign categories and/or particular values to different values that refer to a single data point. For example, in a second row of the table, network device 250-2 is associated with an identifier of "2," and in a fourth row of the table, network device 250-2 is associated with an identifier of "02." To normalize the information, network analytic record device 210 may assign a particular identifier to the value in the second row of the table and the value in the fourth row of the table (e.g., "2," as shown by reference number 545).

As another example, in a first row, a third row, and a fifth row of the table, maximum CPU utilization values are formatted as a percentage value with two digits after the decimal point. In the second row and the fourth row of the table, maximum CPU utilization values are formatted as a decimal value with three digits after the decimal point. To normalize the information, network analytic record device 210 may assign a particular format to the maximum CPU utilization values (e.g., a percentage value with two digits after the decimal point, as shown by reference number 550).

In this way, network analytic record device 210 may structure and/or normalize attribute information and/or operational information, which may simplify analysis of the attribute information and operational information and/or reduce processor resources used to determine predictive models, business impacts, and/or remediation plans.

As indicated above, FIGS. 5A-5C are provided merely as an example. Other examples are possible and may differ from what was described with regard to FIGS. 5A-5C.

Figure 6:
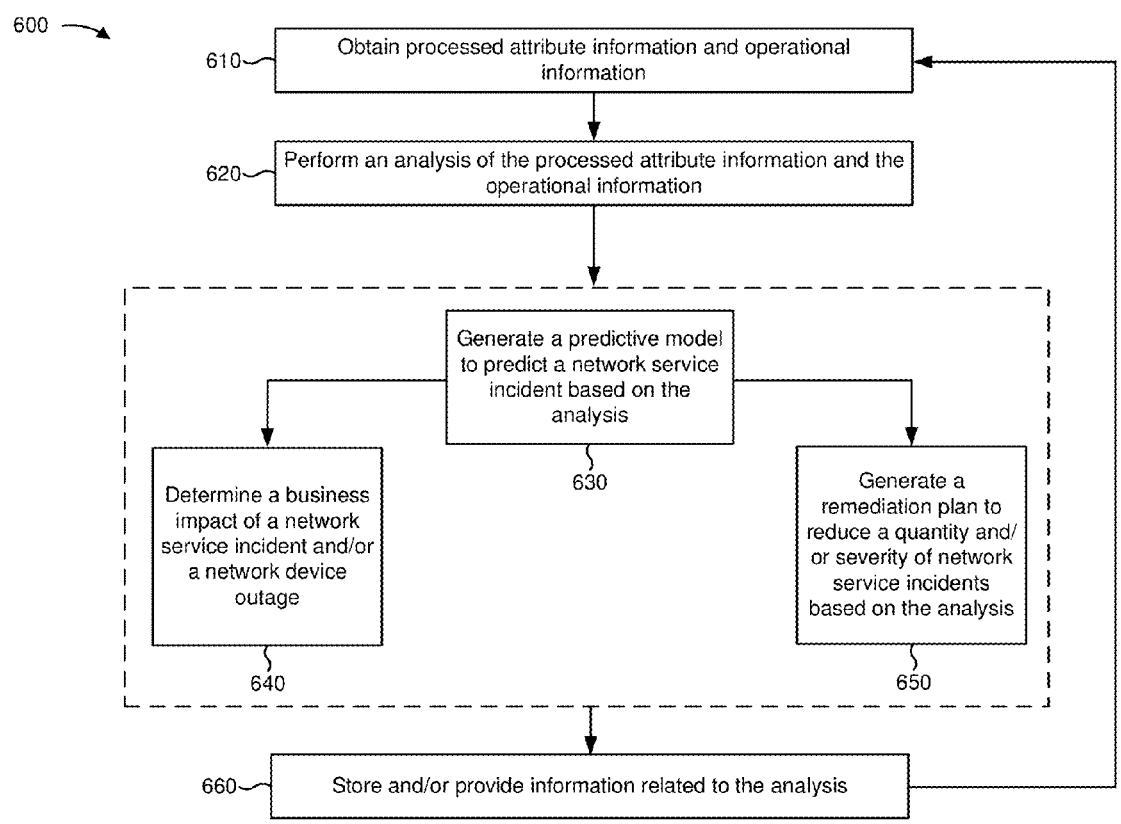
FIG. 6 is a flow chart of an example process for processing standardized and normalized information to determine business impacts, predictive models, and/or remediation plans related to a network service incident.

FIG. 6 is a flow chart of an example process 600 for processing standardized and normalized information to determine business impacts, predictive models, and/or remediation plans related to a network service incident. In some implementations, one or more process blocks of FIG. 6 may be performed by network analytic record device 210. In some implementations, one or more process blocks of FIG. 6 may be performed by another device or a group of devices separate from or including network analytic record device 210, such as network monitoring device 220, user device 230, and network device 250.

As shown in FIG. 6, process 600 may include obtaining processed attribute information and operational information (block 610). For example, network analytic record device 210 may obtain processed (structured and normalized) attribute information and operational information, as described in more detail in connection with FIGS. 5A-5C, above. In some implementations, network analytic record device 210 may obtain the structured/normalized attribute information and operational information from storage. In some implementations, the structured/normalized attribute information and operational information may be associated with criticality coefficients that may be determined as described in more detail in connection with FIGS. 5A-5C, above.

As further shown in FIG. 6, process 600 may include performing an analysis of the processed attribute information and operational information (block 620). For example, network analytic record device 210 may perform an analysis of the processed attribute information and operational information. Network analytic record device 210 may perform the analysis to generate a predictive model to predict a network service incident, as described in more detail in connection with block 630 of FIG. 6. Additionally, or alternatively, network analytic record device 210 may perform the analysis of the attribute information and operational information to project a business impact associated with a network service incident, a particular location, and/or network device 250, as described in more detail in connection with block 640 of FIG. 6. Additionally, or alternatively, network analytic record device 210 may perform the analysis to generate a remediation plan to reduce a quantity of network service incidents and/or a cost associated with network 240, as described in more detail in connection with block 650 of FIG. 6.

As further shown in FIG. 6, process 600 may include generating a predictive model to predict a network service incident based on the analysis (block 630). For example, network analytic record device 210 may generate a predictive model based on operational information. The predictive model may determine (e.g., predict, estimate, project, etc.) a probability of a network service incident based on attribute information and operational information associated with the network service.

A network service incident may include a network service interruption (e.g., in which a network service is not provided for a finite period of time), a network service failure (e.g., in which a network service is not provided for a longer period of time than a network service interruption), a service level degradation (e.g., in which a quality of service associated with a network service degrades and/or is reduced), or the like. A network service incident may be associated with (e.g., caused by) a failure of one or more network devices 250 associated with the network service. For example, assume that network device 250 provides a network service. If network device 250 fails, network device 250 may cause a failure, an interruption, and/or a service level degradation of the network service.

In some implementations, a network service incident may be associated with a priority. For example, a network service incident that affects a relatively larger quantity of users (e.g., larger than a smaller quantity of users, etc.), that is associated with a relatively higher cost (e.g., higher than a relatively lower cost, etc.), or the like, may be associated with a higher priority than a network service incident that affects a smaller quantity of users or is associated with a relatively lower cost. In some implementations, the priorities may include, for example, a low priority, a medium priority, a high priority, and/or a critical priority.

Additionally, or alternatively, an incident may be caused by a particular usage level of one or more network devices 250. For example, assume that network device 250 is capable of routing network traffic of a network service at a rate of 100 gigabits per second. Assume further that network device 250 receives network traffic of the network service at a rate of 150 gigabits per second. In this example, network device 250 may cause a network service incident based on an incapability of network device 250 to route the network traffic at a sufficient rate.

Network analytic record device 210 may generate the predictive model based on information identifying historic network service incidents. For example, the operational information may identify one or more historic network service incidents. Network analytic record device 210 may identify the one or more historic network service incidents, and may analyze variables, in the attribute information and operational information, that are related to the one or more historic network service incidents.

Network analytic record device 210 may perform a statistical analysis to train the predictive model. For example, network analytic record device 210 may perform a regression analysis (e.g., a linear regression analysis, a multiple regression analysis, a quadratic regression analysis, etc.) on the operational information and/or the attribute information to predict future network service incidents based on historic network service incidents. The regression analysis may assign coefficients to particular variables of the attribute information and/or the operational information, and may predict a probability of a future network service incident based on the coefficients and based on values of the particular variables.

As another example, network analytic record device 210 may perform a statistical analysis based on an automatic interaction detection algorithm, such as a chi square automatic interaction detection (CHAID) algorithm. The CHAID algorithm may generate a decision tree based on the operational information and/or the attribute information to determine a probability of a network service incident.

A decision tree may identify a decision related to a variable of operational information and/or attribute information, and may specify a probability of a network service incident based on an outcome of the decision. For example, if a value of the variable satisfies a threshold value, the decision tree may predict a first probability, associated with a first branch of the decision tree, and if the value of the variable does not satisfy the threshold value, the decision tree may predict a second probability (e.g., higher than the first probability, lower than the first probability, etc.), associated with a second branch of the decision tree. In some implementations, a decision, of the decision tree, may include three or more branches. For example, a first branch may be associated with values below a lower value of a range of values, a second branch may be associated with values between the lower value and an upper value of the range of values, and a third branch may be associated with values above the upper value of the range of values.

In some implementations, a decision tree that is generated based on the CHAID algorithm may include multiple, consecutive decisions. For example, branches of a first decision may lead, alternatively, to a second decision or to a third decision, based on an outcome of the first decision. The second decision and/or the third decision may be associated with the outcome of the first decision. For example, a first decision may include "Is the shirt red?" The first decision may lead to a second decision of, for example, "Is the shirt red AND are the pants blue?," and a third decision of, for example, "Is the shirt not red AND are the shoes white?" In this way, the decision tree may identify a probability based on values of multiple variables.

In some cases, a branch of a decision tree may not end in a decision. For example, the decision tree may include a decision in a situation when a particular variable or combination of variables, in the operational information and/or the attribute information, is correlated with a significant difference in a quantity of network service incidents. For example, when a difference in CPU usage is correlated with a significant difference in the quantity of network service incidents, one or more decisions, in the decision tree, may be based on the difference in CPU usage. When the difference in the quantity of network service incidents, associated with a particular variable or combination of variables, is not significant (e.g., does not satisfy a significance threshold, etc.), the decision tree may not include a decision based on the particular variable or combination of variables. When the CHAID algorithm has exhausted the variables or combinations of variables that are associated with a significant difference in the quantity of network service incidents, each branch of the decision tree may not end in a decision.

Network analytic record device 210 may determine whether a difference in the quantity of network service incidents is significant based on a statistical threshold, such as a significance level. For example, network analytic record device 210 may determine a significance threshold (e.g., 5%, 1%, etc.), and may compute a p-value for each of the variables or combinations of variables. Network analytic record device 210 may compare the p-value, of the variables or combinations of variables, to the significance threshold, to determine whether the difference in the quantity of network service incidents based on the variable or combination of variables is significant.

Based on the decision tree, network analytic record device 210 may predict a probability of a future network service incident. For example, if network analytic record device 210 determines that past network service incidents are correlated with a particular network traffic load of a particular network device 250, network analytic record device 210 may determine a decision tree that predicts a future network service incident in situations when the particular network device 250 is associated with the particular network traffic load. For an example of a decision tree, refer to FIG. 9B, below.

In some implementations, network analytic record device 210 may correlate operational information and attribute information of network devices 250 to generate the predictive model. For example, a static attribute of network device 250 may include a CPU capacity of network device 250, and operational information may identify a percentage usage of the CPU capacity of network device 250. Based on information identifying historical network service incidents, and based on the operational information identifying the percentage usage of the CPU of network device 250, network analytic record device 210 may train the predictive model. As one possible example, network analytic record device 210 may identify a peak CPU usage that occurs within one minute of an incident on several occasions, and may predict a future outage when CPU usage, of network device 250, equals or exceeds the peak CPU usage.

By predicting future network service incidents based on historical network service incidents, operational information, and/or attribute information, network analytic record device 210 may permit a device to prevent the future network service incidents. For example, network analytic record device 210 may predict a network service incident on day 2 based on an lesser quantity of network devices 250 being active on day 1 (e.g., lesser than a threshold, greater quantity), and a device (e.g., network monitoring device 220, user device 230, a network administrator device, etc.) may cause the greater quantity network devices 250 to become active on day 1 to prevent the network service incident from occurring. Additionally, or alternatively, network analytic record device 210 may determine network devices 250 with a propensity to cause network service incidents, and may determine a business impact and/or a remediation plan related to the network devices 250, as described in more detail below.

As further shown in FIG. 6, process 600 may include determining a business impact of a network service incident and/or a network device outage (block 640). For example, based on performing the analysis, network analytic record device 210 may determine a business impact of a network service incident and/or an outage of one or more network devices 250. The business impact may describe a predicted quality of service impact, a predicted future cost impact, a service level agreement violation, or the like, associated with a failure of one or more network devices 250.

Network analytic record device 210 may determine the business impact based on a predictive model, in some implementations. For example, network analytic record device 210 may train a predictive model to predict network service incidents based on operational information and/or attribute information, as described above. Network analytic record device 210 may predict a business impact of an event based on the predictive model. For example, network analytic record device 210 may predict that a particular maximum CPU usage may cause a certain quantity of network service incidents, and may predict a business impact based on a predicted cost associated with the certain quantity of network service incidents.

In some implementations, network analytic record device 210 may determine the business impact based on a structured tree, such as a value tree, or the like. The structured tree may identify one or more high-level objectives, one or more sub-objectives, and one or more performance measures. A high-level objective may be associated with one or more sub-objectives, and a sub-objective may be associated with one or more performance measures.

A high-level objective may include a goal, an objective, or the like, that may be achieved based on improving efficiency of operation and/or implementation of network 240. For example, the high-level objectives may include an operating expenditure reduction (e.g., reducing a cost associated with operating network devices 250 and/or providing a network service), a capital expenditure reduction (e.g., reducing a cost associated with implementing network devices 250 and/or a network service), a reduction in risk (e.g., reducing a level or risk associated with security incidents, configuration compliance, service level agreement compliance, etc.).

A sub-objective may be a goal, an objective, or the like, that may facilitate achievement of a high-level objective. For example, a high-level objective of "operating expenditure reduction" may be associated with sub-objectives of "incident severity improvement" and/or "planning network service tasks." As another example, a high-level objective of "capital expenditure reduction" may be associated with a sub-objective of "improvement of asset utilization." As yet another example, a high-level objective of "reduction in risk" may be associated with sub-objectives of "improve security alerts," "improve configuration compliance," and/or "service level agreement compliance."

A performance measure may include an occurrence that may cause a quantifiable change in operation and/or implementation of network 240. Performance measures may be associated with sub-objectives. For example, a sub-objective of "incident improvement" may be associated with a high-level objective of "operating expenditure reduction," and may be associated with performance measures of "lessen quantity of incidents," "simplify incident planning functions," and/or "improve conformance with configuration standards." As another example, a sub-objective of "improvement of asset utilization" may be associated with a high-level objective of "capital expenditure reduction," and may be associated with performance measures of "improve new network device builds and upgrades" and/or "improve network device utilization and/or capacity management." As yet another example, a sub-objective of "improve security alerts" may be associated with a high-level objective of "lower risk," and may be associated with performance measures of "identify security risks" and/or "reduce/predict incidents that cause network service outages."

In some implementations, a sub-objective may be associated with information related to determining a business impact based on a performance measure. For example, a sub-objective may define a cost per incident (e.g., a quantity of dollars spent per incident caused, a quantity of dollars saved per incident prevented, etc.). A performance measure, associated with the sub-objective, may identify a quantity of incidents caused or prevented. For example, the performance measure may identify that a reduction in CPU usage prevented five network service incidents. Based on the quantity of incidents identified by the performance measure, and based on the cost per incident identified by the sub-objective, network analytic record device 210 may determine a business impact for a high-level objective associated with the sub-objective and/or the performance measure.

Network analytic record device 210 may determine a business impact associated with a location based on estimating a criticality coefficient of the location, in some implementations. For example, network analytic record device 210 may determine an average revenue loss per unit time (e.g., dollars per hour, dollars per day, dollars per network service incident per hour, dollars per network service incident per day, etc.), an average productivity loss per unit time (e.g., man-hours per hour of downtime, man-hours per day of downtime, man-hours per network service incident per hour, etc.), or the like, for a location, based on an outage of network devices 250 and/or network services associated with the location.

To continue the above example, network analytic record device 210 may determine a criticality coefficient, of the location, based on the revenue loss per unit time and/or the productivity loss per unit time. For example, a relatively higher revenue loss and/or productivity loss (e.g., higher than a threshold value, higher than a relatively low revenue loss and/or productivity loss) may be associated with a high criticality coefficient, and a relatively lower revenue loss and/or productivity loss may be associated with a low criticality coefficient. Based on the determined criticality coefficient, network analytic record device 210 may determine a business impact of an outage and/or a network service incident at the location. In this way, network analytic record device 210 may determine criticality of locations relative to other locations, which may permit network analytic record device 210 to generate remediation plans that prioritize remediation of high-criticality locations before remediation of low-criticality locations.

By predicting business impacts based on attribute information and/or operational information, network analytic record device 210 may determine opportunities to reduce business impacts of network service incidents, which may reduce costs associated with the network service incidents, improve resilience of network 240, and/or improve efficiency of network devices 250.

As further shown in FIG. 6, process 600 may include generating a remediation plan to reduce a quantity and/or severity of network service incidents based on the analysis (block 650). For example, network analytic record device 210 may generate a remediation plan. The remediation plan may identify one or more actions to perform to reduce a quantity and/or severity of network service incidents. For example, the remediation plan may identify one or more network devices 250 to repair or replace, a location at which to add one or more network devices 250, a network service that requires additional and/or reconfigured network devices 250, or the like. In some implementations, network analytic record device 210 may determine the remediation plan based on a business impact and/or a predictive model, which may be determined as described herein in connection with blocks 630 and 640, above.

For example, assume that network analytic record device 210 determines that a first network device 250 is associated with a relatively high risk (e.g., relatively high as compared to a relatively low risk, based on likelihood of causing a network service incident and/or a business impact of an associated network service incident). Assume further that a predictive model predicts a network service incident related to the first network device 250 when the first network device 250 reaches a particular length of service life. In that case, network analytic record device 210 may generate a remediation plan based on the relatively high risk and the predictive model. The remediation plan may indicate, for example, to replace the first network device 250 before the first network device 250 reaches the particular length of service life.

To continue the example, assume that a second network device 250 is associated with a relatively low risk based on a likelihood of causing a network incident and/or a cost of an associated network incident, and assume that a predictive model predicts an incident when the second network device 250 reaches the particular length of service life. In that case, network analytic record device 210 may generate a remediation plan that prioritizes replacement of the first network device 250 over replacement of the second network device 250. In this way, network analytic record device 210 may determine a remediation plan based on levels of risk and/or predictive models, which may improve reliability of network 240 and/or reduce costs associated with incidents related to network devices 250 in need of servicing.

Network analytic record device 210 may determine a business impact of a remediation plan, in some implementations. For example, network analytic record device 210 may compare values of a performance measure (e.g., a frequency, a likelihood, a severity, etc.) associated with network service incidents before implementing the remediation plan to values of the performance measure after implementing the remediation plan. If the performance measure improves after implementing the remediation plan (e.g., satisfies an improvement threshold, etc.), network analytic record device 210 may determine that the remediation plan is effective. Additionally, or alternatively, if the performance measure does not satisfy the improvement threshold, network analytic record device 210 may determine that the remediation plan is not effective, and may modify and/or discard the remediation plan. In this way, network analytic record device 210 may determine an effectiveness of an implemented remediation plan, which may permit network analytic record device 210 to improve efficiency and/or reliability of network devices 250, and to reduce costs associated with a network service incident.

As further shown in FIG. 6, process 600 may include storing and/or providing information related to the analysis (block 660) and/or returning to block 610. For example, network analytic record device 210 may store and/or provide information related to the analysis. In some implementations, network analytic record device 210 may provide the information to another device, such as network monitoring device 220 and/or user device 230. Additionally, or alternatively, network analytic record device 210 may store the information, and/or may perform further analysis based on updated operational information.

In some implementations, network analytic record device 210 may provide information identifying the predictive model and/or the remediation plan to network monitoring device 220. For example, network monitoring device 220 may monitor network devices 250-1 through 250-N based on the predictive model and/or the remediation plan, as described in more detail in connection with FIG. 10, below.

In some implementations, network analytic record device 210 may return to block 610, as shown in FIG. 6. For example, network analytic record device 210 may obtain additional processed attribute information and/or operational information (e.g., from network monitoring device 220, based on monitoring network devices 250, based on a user input, etc.), and may perform an analysis of the additional processed attribute information and/or operational information. Based on the analysis, network analytic record device 210 may generate and/or revise a predictive model, a business impact, and/or a remediation plan. For example, based on additional attribute information indicating that a particular location has increased a quantity of network devices 250 in operation, network analytic record device 210 may revise a predictive model relating to failures associated with the particular location. In this way, network analytic record device 210 may revise a predictive model, a business impact, and/or a remediation plan based on additional attribute information and/or operational information, which may improve predictions by network analytic record device 210 and reduce frequency of network outages.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7B:
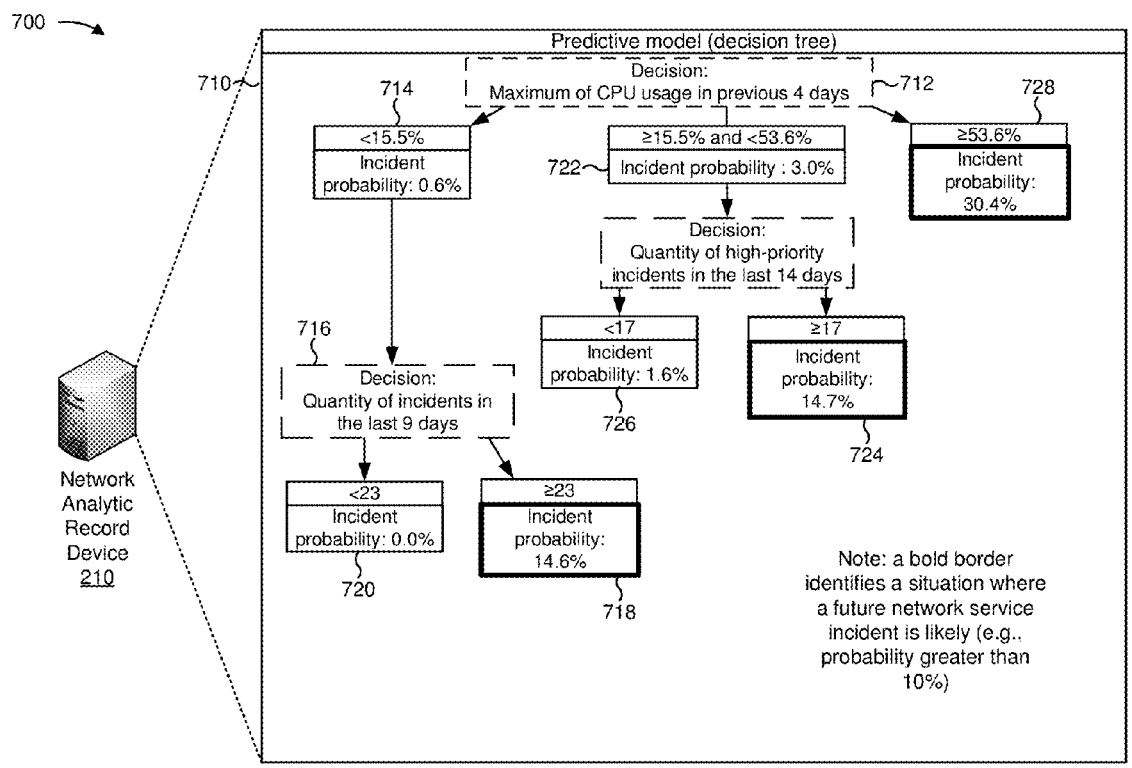

FIGS. 7A and 7B are diagrams of an example implementation 700 relating to example process 600 shown in FIG. 6. FIGS. 7A and 7B show an example of processing normalized information to determine a predictive model. For the purpose of FIGS. 7A and 7B, assume that the operations described in connection with FIGS. 5A-5C have been performed. In other words, assume that network analytic record device 210 stores a data structure of structured, normalized attribute information and operational information relating to a set of network devices 250-1 through 250-N.

As shown in FIG. 7A, and by reference number 702, network analytic record device 210 may obtain processed information (e.g., structured and normalized attribute information and operational information). Assume that network analytic record device 210 obtains the processed information from local storage. As shown by reference number 704, network analytic record device 210 may determine variables for predicting network service incidents based on the processed information. Assume that network analytic record device 210 calculates the variables based on the processed attribute information and the operational information.

As shown by reference number 706, network analytic record device 210 calculates device performance variables, network service performance variables, and incident reporting variables. For example, for device performance variables, network analytic record device 210 calculates prior usage (e.g., CPU usage and memory usage in the previous day, two days, three days, four days, and/or five days), prior aggregate usage (e.g., average and maximum CPU usage and memory usage in the previous day, two days, three days, four days, and/or five days), and prior variance (e.g., variance in CPU usage and memory usage in each of the previous day, two days, three days, four days, and/or five days).

As another example, for network service performance variables, network analytic record device 210 calculates prior bandwidth usage (e.g., bandwidth usage associated with a network service, in the previous day, two days, three days, four days, and/or five days), prior aggregate bandwidth usage (e.g., average and maximum bandwidth usage associated with a network service, in the previous day, two days, three days, four days, and/or five days), and prior variance (e.g., variance in bandwidth usage associated with a network service, in the previous day, two days, three days, four days, and/or five days).

As another example, for incident reporting variables, network analytic record device 210 determines incident priority variables (e.g., a quantity of low-level criticality incidents, medium-level criticality incidents, high-level criticality incidents, and critical-level criticality incidents, in each of the previous fourteen days), incident quantity variables (e.g., a quantity of incidents, of any criticality, in each of the previous fourteen days), and prior large-scale incidents (e.g., a quantity of network service incidents associated with a metropolitan area network and/or an Internet outage in the last fourteen days).

As shown by reference number 708, network analytic record device 210 may analyze the processed information by performing a chi-squared automatic interaction detection (CHAID) analysis to determine which of the variables are correlated with historic network service incidents. For example, network analytic record device 210 may determine a dependent variable (e.g., network service incidents), and may analyze values of the variables of the processed information to train a predictive model (e.g., a decision tree).

As shown in FIG. 7B, and by reference number 710, the predictive model may identify a set of decisions based on which to predict a likelihood of a network service incident. As shown by reference number 712, a first decision may include determining whether a maximum value of a CPU usage, in the previous four days, is above, below, or within a range of 15.5% to 53.6%. As shown by reference number 714, if the maximum CPU usage in the previous four days does not exceed a value of 15.5%, network analytic record device 210 may proceed to a second decision. As shown by reference number 716, the second decision may include determining whether a quantity of incidents in the previous nine days exceeds a threshold value (e.g., 23).

As shown by reference number 718, if the quantity of incidents exceeds the threshold value, network analytic record device 210 may determine that a future incident is likely (e.g., with a 14.6% chance of an incident occurring). As shown by reference number 718, a bold border may indicate that the future network service incident is likely. Assume that network analytic record device 210 determines that a future network service incident is likely when a probability of the future network service incident is greater than 10%. As shown by reference number 720, if the quantity of incidents does not exceed the threshold value, network analytic record device 210 may determine that a future incident is unlikely (e.g., with a 0.0% chance of an incident occurring).

As shown by reference number 722, if the maximum CPU usage in the previous four days is between 15.5% and 53.6%, network analytic record device 210 may determine whether a quantity of high-priority incidents in the last 14 days equals or exceeds a threshold quantity (e.g., 17). As shown by reference number 724, if the quantity of high-priority incidents in the last 14 days equals or exceeds the threshold quantity, network analytic record device 210 may determine that a future incident is likely (e.g., with a 14.7% chance of an incident occurring). As shown by reference number 726, if the quantity of high-priority incidents in the last 14 days does not equal or exceed the threshold quantity, network analytic record device 210 may determine that a future incident is unlikely (e.g., with a 1.6% chance of an incident occurring).

As shown by reference number 728, if the maximum CPU usage for the previous four days equals or exceeds 53.6%, network analytic record device 210 may determine that a future incident is likely (e.g., with a 30.4% chance of an incident occurring). Assume that network analytic record device 210 stores information identifying the predictive model. In this way, network analytic record device 210 may generate an analytic model to predict network service incidents based on operational information and/or attribute information obtained from network devices 250, which may improve predictability of the network service incidents and, thus, improve reliability of network services and/or reduce costs associated with providing the network services.

As indicated above, FIGS. 7A and 7B are provided merely as an example. Other examples are possible and may differ from what was described with regard to FIGS. 7A and 7B.

Figure 8:
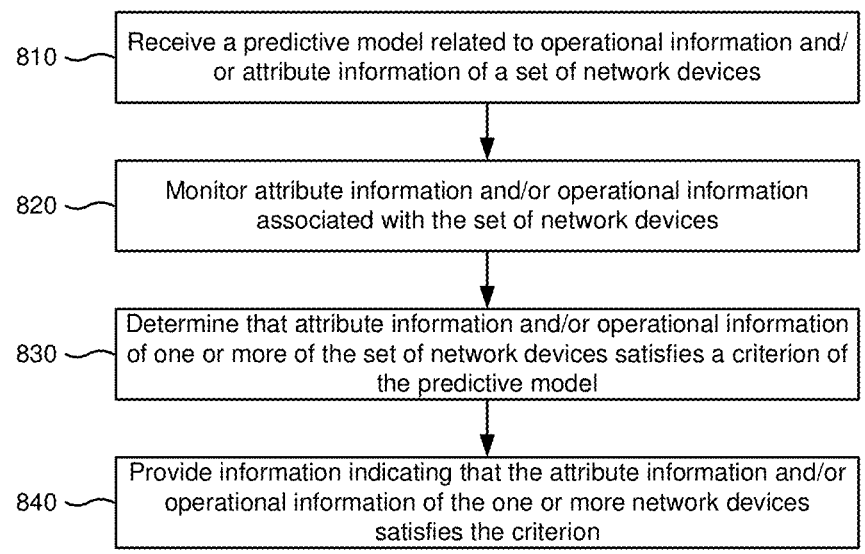
FIG. 8 is a flow chart of an example process for monitoring network devices based on a predictive model.

FIG. 8 is a flow chart of an example process 800 for monitoring network devices based on a predictive model. In some implementations, one or more process blocks of FIG. 8 may be performed by network monitoring device 220. In some implementations, one or more process blocks of FIG. 8 may be performed by another device or a group of devices separate from or including network monitoring device 220, such as network analytic record device 210, user device 230, and network device 250.

As shown in FIG. 8, process 800 may include receiving a predictive model related to operational information and/or attribute information of a set of network devices (block 810). For example, network monitoring device 220 may receive a predictive model from network analytic record device 210. The predictive model may predict future network service incidents based on operational information and/or attribute information of a set of network devices 250.

The predictive model may correlate operational information, attribute information, and/or historic network service incidents. For example, the predictive model may indicate that a particular value of a variable of operational information, in association with a particular network device 250, is a relatively strong predictor of a network service incident. Based on the predictive model, network monitoring device 220 may monitor the particular network device 250 and/or the variable of the operational information, as described in more detail below.

In some implementations, network monitoring device 220 may obtain the operational information by requesting the operational information. For example, network monitoring device 220 may provide a request for the operational information to the set of network devices 250, and may receive the operational information based on the request. Additionally, or alternatively, network monitoring device 220 may determine the operational information. For example, network monitoring device 220 may be a gateway, a router, or the like, for a network service associated with the set of network devices 250, and may determine the operational information based on routing network traffic associated with the network service.

As further shown in FIG. 8, process 800 may include monitoring attribute information and/or operational information associated with the set of network devices (block 820). For example, network monitoring device 220 may monitor attribute information and/or operational information, associated with the set of network devices 250, based on the predictive model. Network monitoring device 220 may compare the attribute information and/or operational information to a criterion, a value, a threshold, etc. identified by the predictive model, to predict a network service incident associated with the set of network devices 250.

In some implementations, network monitoring device 220 may monitor the attribute information and/or operational information based on a remediation plan. For example, assume that a remediation plan indicates to replace network device 250 when network device 250 is associated with a CPU usage greater than or equal to a threshold CPU usage on seven consecutive days. In this example, network monitoring device 220 may monitor CPU usage of network device 250, and may provide information indicating to replace network device 250 when the CPU usage equals or exceeds the threshold on seven consecutive days, as described in more detail below.

As further shown in FIG. 8, process 800 may include determining that attribute information and/or operational information of one or more of the set of network devices satisfies a criterion of the predictive model (block 830). For example, network monitoring device 220 may monitor values of attribute information and/or operational information of the set of network devices 250. Network monitoring device 220 may determine that a value of the attribute information and/or operational information satisfies a criterion (e.g., a threshold, etc.) of the predictive model and/or a remediation plan. For example, network monitoring device 220 may compare the value of the attribute information and/or operational information to a threshold identified in a locally stored table of monitored values, and may determine that the value satisfies the threshold.

As further shown in FIG. 8, process 800 may include providing information indicating that the attribute information and/or operational information of one or more network devices satisfies the criterion (block 840). For example, based on determining that the attribute information and/or operational information satisfies the criterion of the predictive model and/or the remediation plan, network monitoring device 220 may provide information. The information may indicate the value of the attribute information and/or operational information, one or more network devices 250 and/or a network service associated with the value of the attribute information and/or operational information, information related to the value of the attribute information and/or operational information, or other information.

In some implementations, network monitoring device 220 may provide a notification to user device 230. For example, network monitoring device 220 may provide an indication that the value of the attribute information and/or operational information satisfies the criterion, may provide information identifying a predictive model and/or a remediation plan with which the criterion is associated, may identify one or more network services and/or network devices 250 to which the attribute information and/or operational information and/or the criterion are related, or the like. In this way, network monitoring device 220 may notify user device 230 based on a predictive model and/or a remediation plan, which may permit a user of user device to take action before an incident occurs, thus improving reliability and/or efficiency of network services provided via network 240.

In some implementations, network monitoring device 220 may provide information to network analytic record device 210. For example, based on determining that a value satisfies a criterion, network monitoring device 220 may provide an indication that the value of the attribute information and/or operational information satisfies the criterion, may provide information identifying a predictive model and/or a remediation plan with which the criterion is associated, may identify one or more network services and/or network devices 250 to which the attribute information and/or operational information and/or the criterion are related, or the like.

In some implementations, network monitoring device 220 may determine and/or provide additional attribute information and/or operational information. For example, network monitoring device 220 may determine additional attribute information and/or operational information that is possibly related to the value satisfying the criterion, and may provide the additional operational information to network analytic record device 210. Network analytic record device 210 may structure, normalize, and/or analyze the additional attribute information and/or operational information, and may associate the additional attribute information and/or operational information with attribute information and/or operational information. In some implementations, network analytic record device 210 may update a predictive model based on the additional operational information. For example, if the predictive model predicts a network service incident based on the additional attribute information and/or operational information, and the predicted network service incident does not occur, network analytic record device 210 may update the predictive model (e.g., by reducing a probability associated with the predicted network service incident, by changing a threshold associated with the additional operational information, etc.).

In some implementations, network analytic record device 210 and/or network monitoring device 220 may cause a change to occur on one or more network devices 250 based on the value of the attribute information and/or operational information satisfying the criterion. For example, network analytic record device 210 and/or network monitoring device 220 may configure network device 250 to prevent a predicted network service incident, may reroute traffic among network devices 250 to mitigate an impact of the predicted network service incident, may activate one or more network devices 250 to handle a predicted network traffic load, or the like. In this way, network analytic record device 210 and/or network monitoring device 220 may configure one or more network devices 250 to mitigate and/or prevent a network service incident, which may improve reliability of network 240 and/or reduce a quantity of user input required to administer network 240.

In this way, network monitoring device 220 may monitor network devices 250 based on a predictive model, which may permit network monitoring device 220 to predict a future network service incident based on operational information of the network devices 250. By predicting the future network service incident, network analytic record device 210 may improve reliability of network services and/or reduce costs associated with administrating network 240.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
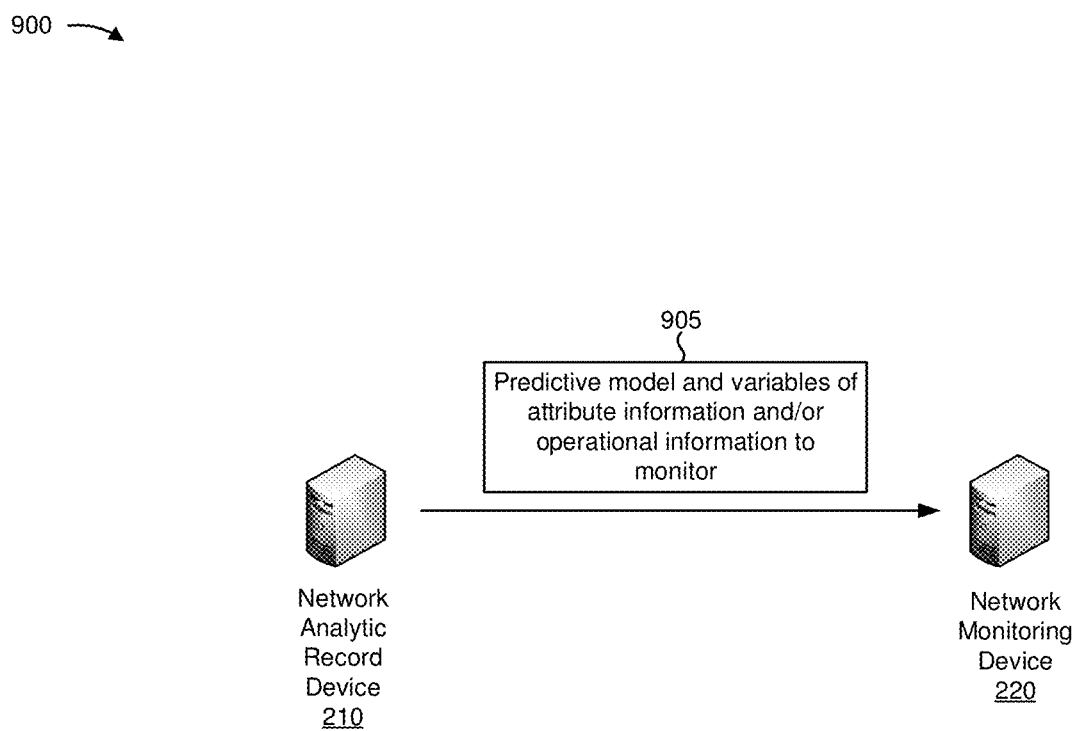
FIGS. 9A-9C are diagrams of an example implementation relating to the example process shown in FIG. 8.
Figure 9B:
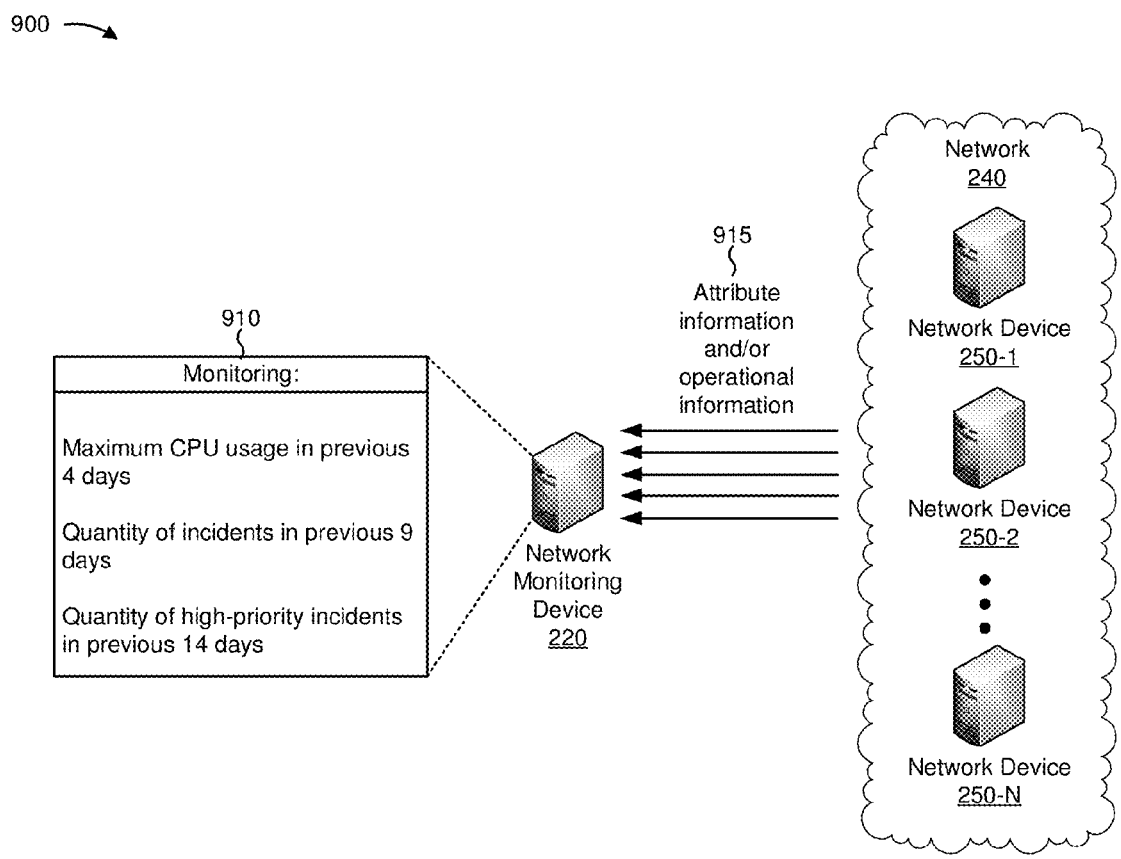
Figure 9C:
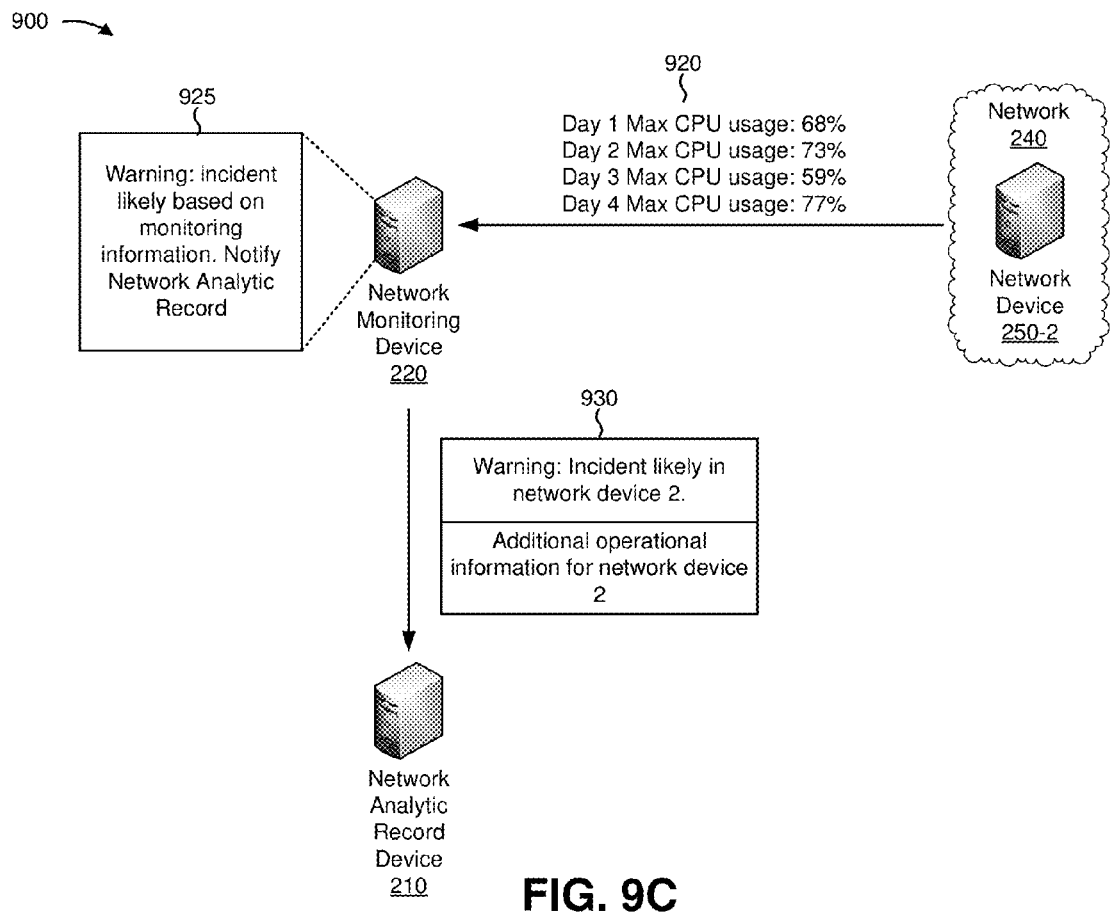

FIGS. 9A-9C are diagrams of an example implementation 900 relating to example process 800 shown in FIG. 8. FIGS. 9A-9C show an example of monitoring network devices based on a predictive model. For the purposes of FIGS. 9A-9C, assume that the operations described in connection with FIGS. 5A-5C, 9A, and 9B have been performed. That is, assume that network analytic record device 210 stores a predictive model, based on which network analytic record device 210 may predict network service outages associated with a set of network devices 250-1 through 250-N.

As shown in FIG. 9A, and by reference number 905, network analytic record device 210 may provide, to network monitoring device 220, information identifying the predictive model and variables of the attribute information and/or operational information to monitor. In some implementations, network analytic record device 210 may provide the information identifying the predictive model based on determining the predictive model. Additionally, or alternatively, network monitoring device 220 may request the information identifying the predictive model (e.g., to determine one or more variables of monitoring information to monitor).

As shown in FIG. 9B, and by reference number 910, network monitoring device 220 may monitor the variables of the attribute information and/or operational information. Here, as shown, network monitoring device 220 monitors a maximum CPU usage in the previous four days, a quantity of network service incidents in the previous nine days, and a quantity of high-priority network service incidents in the previous fourteen days.

As shown by reference number 915, network monitoring device 220 may obtain attribute information and/or operational information of the set of network devices 250-1 through 250-N to determine whether variables of the operational information indicate that a network service incident is likely based on the predictive model.

As shown in FIG. 9C, and by reference number 920, network monitoring device 220 may receive operational information from network device 250-2 that indicates maximum CPU usage values for the previous four days (e.g., "Day 1 Max CPU usage: 68%," "Day 2 Max CPU usage: 73%," "Day 3 Max CPU usage: 59%," and "Day 4 Max CPU usage: 77%"). As shown by reference number 925, network analytic record device 210 may determine that the maximum CPU usage value for each of the previous four days exceeds the threshold value of 53.6%, indicating that a network service incident is likely to occur with regard to network device 250-2.

As shown, based on the predictive model predicting the network service incident, network monitoring device 220 may notify network analytic record device 210. As shown by reference number 930, network monitoring device 220 may provide a notification to network analytic record device 210 indicating that the predictive model predicts a network service incident with regard to network device 250-2. As further shown, network monitoring device 220 may provide additional operational information for network device 2 based on providing the notification. Network analytic record device 210 may store the notification, and/or may analyze the additional operational information to determine whether the predictive model is accurate.

In this way, network monitoring device 220 may predict network service incidents based on a predictive model generated by network analytic record device 210. By predicting network service incidents before the network service incidents occur, network monitoring device 220 may reduce a quantity of network service incidents that occur. By identifying variables that may cause the network service incidents, network analytic record device 210 and/or network monitoring device 220 may enable a network administrator to reduce costs associated with network 240 and/or improve resilience of network 240.

As indicated above, FIGS. 9A-9C are provided merely as an example. Other examples are possible and may differ from what was described with regard to FIGS. 9A-9C.

In this way, a network analytic record device may standardize and normalize information related to network devices that provide a network service. The network analytic record device may analyze the standardized and normalized information to generate a predictive model to predict future network service incidents based on past network service incidents, determine business impacts of network service incidents, and/or generate a remediation plan to improve network functionality. In this way, the network analytic record device may improve network efficiency and/or resilience.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory storing instructions; and
one or more processors to execute the instructions to:
obtain first information related to network devices of a network,
obtain second information related to at least one of:
the network devices, or
one or more historic network service incidents associated with the network devices,
the second information being different than the first information,
the one or more historic network service incidents being related to network services provided in association with the network devices, and
the one or more historic network service incidents including at least one of:
outages, or
degradations of one or more network services;
parse the first information and the second information;
structure, based on parsing the first information and the second information, the first information and the second information to generate structured first information and structured second information;
normalize the structured first information and the structured second information to generate normalized first information and normalized second information;
perform an analysis of the normalized first information and the normalized second information;
train a predictive model based on the analysis of the normalized first information and the normalized second information,
the predictive model predicting a probability of a future network service incident based on at least one of:
the normalized first information, or
the normalized second information; and
cause third information, related to the network devices, to be monitored based on the predictive model.

2. The device of claim 1, where the one or more processors are further to:
determine that a first portion and a second portion, of at least one of the first information or the second information, relate to particular data,
the first portion including different information than the second portion; and
assign a value, to the first portion and the second portion, based on the first portion and the second portion relating to the particular data,
the value identifying the particular data.

3. The device of claim 1, where the one or more processors, when causing the third information to be monitored, are further to:
receive the third information; and
process the third information to associate the third information with the normalized first information and the normalized second information.

4. The device of claim 1, where the first information relates to a configuration of the network devices; and
where the second information relates to operation of the network devices; and
where the third information relates to the operation of the network devices,
the third information being monitored after the normalized second information is obtained.

5. The device of claim 1, where the one or more processors, when performing the analysis, are further to:
perform a chi square automatic interaction detection analysis to train the predictive model.

6. The device of claim 1, where the one or more processors are to:
predict a network service incident, with regard to one or more of the network services, based on the third information and the predictive model; and
provide a notification to one or more other devices based on predicting the network service incident.

7. The device of claim 1, where the one or more processors, when training the predictive model, are to:

determine a first criticality coefficient and a second criticality coefficient,
  a network service incident that is associated with a relatively higher cost being assigned the first criticality coefficient, and
  a network service incident that is associated with a relatively lower cost being assigned the second criticality coefficient;
determine a first cost associated with a first network service incident and a second cost associated with a second network service incident,
  the first cost being a higher cost than the second cost;
assign, to the first network service incident, the first criticality coefficient; and
assign, to the second network service incident, the second criticality coefficient.

8. A non-transitory computer-readable medium storing instructions, the instructions comprising:
  one or more instructions that, when executed by one or more processors, cause the one or more processors to:
    obtain first information related to network devices of a network,
    obtain second information related to the network devices and to one or more historic network service incidents associated with the network devices,
      the second information being different than the first information, and
      the one or more historic network service incidents being related to network services provided in association with the network devices;
    structure the first information and the second information to generate structured first information and structured second information;
    normalize the structured first information and the structured second information to generate normalized first information and normalized second information;
    perform an analysis of the normalized first information and the normalized second information;
    predict a business impact, related to a future network service incident, based on performing the analysis of the normalized first information and the normalized second information;
    generate a remediation plan, based on the business impact and related to the network devices, to reduce a cost related to the future network service incident; and
    provide information related to at least one of:
      the remediation plan, or
      the business impact.

9. The non-transitory computer-readable medium of claim 8, where the one or more instructions, that cause the one or more processors to predict the business impact, cause the one or more processors to:
  determine a historic cost related to the one or more historic network service incidents;
  determine a relationship between the normalized first information, the normalized second information, and the historic cost; and
  predict a future cost related to the future network service incident based on the relationship between the normalized first information, the normalized second information, and the historic cost.

10. The non-transitory computer-readable medium of claim 8, where the one or more instructions, that cause the one or more processors to predict the business impact, cause the one or more processors to:
  identify a location that is associated with one or more of the network devices and one or more of the network services,
  determine a cost associated with an outage at the location,
    the outage at the location being associated with one or more network service incidents related to at least one of:
      the one or more of the network devices, or
      the one or more of the network services; and
  where the one or more instructions, that cause the one or more processors to generate the remediation plan, cause the one or more processors to:
    generate the remediation plan based on the cost associated with the outage,
      the remediation plan identifying one or more actions to perform with regard to at least one of:
        the location, or
        the one or more of the network devices.

11. The non-transitory computer-readable medium of claim 10, where the cost is a first cost; and
  where the location is a first location; and
  where the one or more instructions, that cause the one or more processors to determine the first cost, cause the one or more processors to:
    determine a second cost associated with a second location,
      the second location being different than the first location, and
      the second cost being a lower cost than the first cost; and
  where the one or more instructions, that cause the one or more processors to generate the remediation plan, cause the one or more processors to:
    generate the remediation plan to identify one or more actions to perform with regard to the second location,
      the one or more actions to be performed with regard to the second location being associated with a lower priority than the one or more actions to be performed with regard to the first location.

12. The non-transitory computer-readable medium of claim 8, where a network device is modified based on the remediation plan; and
  where the one or more instructions, when executed by the one or more processors, cause the one or more processors to:
    cause third information to be obtained,
      the third information relating to the modified network device, and
      the third information being obtained after the modified network device is modified; and
    determine an effectiveness of the remediation plan based on the third information.

13. The non-transitory computer-readable medium of claim 8, where the one or more historic network service incidents and the future network service incident include at least one of:
  a network service failure in which a network service is not provided,
  a network service interruption in which a network service is not provided for a finite period of time, or
  a network service degradation in which a network service is provided at a reduced service level.

14. The non-transitory computer-readable medium of claim 8, where the first information relates to a configuration of the network devices; and where the second information relates to operation of the network devices.

15. A method, comprising:
   obtaining, by a device, first information related to network devices of a network,
   obtaining, by the device, second information related to at least one of:
      the network devices, or
      one or more historic network service incidents associated with the network devices,
         the second information being different than the first information, and
         the one or more historic network service incidents being related to network services provided in association with the network devices;
   structuring, by the device, the first information and the second information to generate structured first information and structured second information;
   normalizing, by the device, the structured first information and the structured second information to generate normalized first information and normalized second information;
   performing, by the device, an analysis of the normalized first information and the normalized second information;
   training, by the device, a predictive model based on the analysis of the normalized first information and the normalized second information,
      the predictive model predicting a probability of a future network service incident based on the normalized first information and the normalized second information; and
   causing third information, related to the network devices, to be monitored based on the predictive model.

16. The method of claim 15, further comprising:
   predicting, based on the predictive model, that a first network device, of the network devices, will be associated with a first quantity of future network service incidents;
   predicting, based on the predictive model, that a second network device, of the network devices, will be associated with a second quantity of future network service incidents,
      the second quantity being a lesser quantity than the first quantity; and
   generating a remediation plan that identifies one or more actions to perform to reduce the first quantity and the second quantity,
      the remediation plan prioritizing actions to be performed with regard to the first network device over actions to be performed with regard to the second network device.

17. The method of claim 15, where the first information relates to static attributes of the network devices; and
   where the second information relates to operation of the network devices.

18. The method of claim 17,
   where the first information relates to a particular network device and configuration of the particular network device, and
   where the second information relates to operation of the particular network device and historic network service incidents associated with the particular network device.

19. The method of claim 18 further comprising:
   receiving the third information,
      the third information relating to operation of the particular network device and relating to one or more new network service incidents associated with the particular network device,
      the third information being received after the second information, and
      the one or more new network service incidents occurring after the second information is obtained; and
   associating the third information with the first information relating to the particular network device.

20. The method of claim 15, where the one or more historic network service incidents and the future network service incident include at least one of:
   a network service failure in which a network service is not provided,
   a network service interruption in which a network service is not provided for a finite period of time, or
   a network service degradation in which a network service is provided at a reduced service level.

* * * * *